US012180051B1

(12) United States Patent
Hamlik et al.

(10) Patent No.: US 12,180,051 B1
(45) Date of Patent: Dec. 31, 2024

(54) SINGLE—DOUBLE LOAD CLAMP WITH TELESCOPING CENTER ARM ACTUATOR

(71) Applicant: Rightline Equipment, Inc., Rainier, OR (US)

(72) Inventors: Jim D. Hamlik, Vancouver, WA (US); Joel D. Hamlik, Vancouver, WA (US); Amanda Frazier, Vancouver, WA (US); Cameron Burak, Vancouver, WA (US)

(73) Assignee: RIGHTLINE EQUIPMENT, INC., Rainier, WA (US)

( * ) Notice: Subject to any disclaimer, the term of this patent is extended or adjusted under 35 U.S.C. 154(b) by 255 days.

(21) Appl. No.: 17/894,146

(22) Filed: Aug. 23, 2022

Related U.S. Application Data

(60) Provisional application No. 63/324,149, filed on Mar. 27, 2022, provisional application No. 63/236,227, filed on Aug. 23, 2021.

(51) Int. Cl.
*B66F 9/18* (2006.01)

(52) U.S. Cl.
CPC .................................... *B66F 9/183* (2013.01)

(58) Field of Classification Search
CPC .................................. B66F 9/18; B66F 9/183
See application file for complete search history.

(56) References Cited

U.S. PATENT DOCUMENTS

| | | | | |
|---|---|---|---|---|
| 5,707,201 A * | 1/1998 | Hamlik | ................... | B66F 9/148 91/533 |
| 5,807,060 A * | 9/1998 | Hamlik | ................... | B66F 9/148 91/367 |
| 10,207,907 B1 * | 2/2019 | Hamlik | ...................... | B66F 9/22 |
| 10,589,970 B1 * | 3/2020 | Hamlik | ................... | B66F 9/122 |
| 11,220,416 B1 * | 1/2022 | Hamlik | ................... | B66F 9/149 |
| 11,370,644 B1 * | 6/2022 | Hamlik | ................... | B66F 9/205 |
| 11,608,256 B1 * | 3/2023 | Hamlik | ................... | B66F 9/183 |
| 11,878,900 B1 * | 1/2024 | Hamlik | ................... | B66F 13/00 |
| 12,006,197 B1 * | 6/2024 | Hamlik | ................... | B66F 9/148 |
| 2016/0152455 A1 * | 6/2016 | Hamlik | ................... | B66F 9/148 414/671 |
| 2018/0155168 A1 * | 6/2018 | Hamlik | ................... | B66F 9/143 |
| 2019/0210851 A1 * | 7/2019 | Hamlik | ................... | B66F 9/205 |
| 2022/0063973 A1 * | 3/2022 | Hamlik | ................... | B66F 9/183 |
| 2023/0136144 A1 * | 5/2023 | Hamlik | ...................... | B66F 9/24 701/50 |

* cited by examiner

*Primary Examiner* — Kaitlin S Joerger
(74) *Attorney, Agent, or Firm* — Rylander & Associates, PC; Philip R. M. Hunt

(57) ABSTRACT

A single-double load clamp load handler for a lift truck. The load handler includes a frame, a first, a second and a third clamp arms, each with a clamp plate, and each with a sliding beam slidingly coupled to the frame. A clamp actuator for the third clamp arm is a telescoping actuator. Thee third clamp plate is thinner and has less volume than either the first clamp plate or the second clamp plate.

26 Claims, 15 Drawing Sheets

SINGLE—DOUBLE LOAD CLAMP WITH TELESCOPING CENTER ARM ACTUATOR

FIELD OF THE INVENTION

The present invention relates to cargo handling equipment. More particularly, the present invention relates to carton clamps for use primarily with lift trucks.

BACKGROUND

Material handling vehicles such as lift trucks are used to pick up and deliver loads between stations. A typical lift truck 10 has a mast 12, which supports a load-lifting carriage 14 that can be raised along the mast 12 (see FIG. 1). The carriage 14 typically has one or more carriage bars 16 to which a fork frame 18 is mounted. The carriage bars 16 are coupled to the mast in a way that allows the lift truck 10 to move the carriage bars 16 up and down, but not laterally relative to the truck. The fork frame 18 carries a pair of forks 20. An operator of the lift truck 10 maneuvers the forks 20 beneath a load prior to lifting it.

Instead of forks 20, a lift truck 10 may have a load clamp assembly 32 coupled to its mast 12 (See FIG. 2). The load clamp assembly 32 typically comprises a frame 40, one or more actuators 36 and two clamp arms 34. The actuators 36 are configured to move the clamp arms 34 toward or away from each other with actuator rods 38. The clamp arms 34 typically have a gripping material on the inside surfaces that contact the load. The gripping material, such as rubber or polyurethane, provides high friction contact surface for gripping the load and also provides a compressible and resilient contact surface to protect the load from superficial damage from the clamp arms 34. In use, the operator of the lift truck 10 approaches a load to be carried, such as a stack of cartons or a large appliance, such as a refrigerator. As the lift truck 10 approaches the load, the operator uses controls to open the gap between the clamp arms 34 wider than the load and may adjust the height of the clamp arms 34 so they will engage the load in a suitable location. The operator then maneuvers the lift truck 10 to straddle the load between the clamp arms 34. When the clamp arms 34 are positioned suitably around the load, the operator uses controls to bring the clamp arms 34 together, grasping the load. The operator then uses other controls to raise the load clamp assembly 32, raising the load off the floor, the load held between the clamp arms 34 by friction. The operator then drives the load to a desired location.

Load clamps, also known as carton clamps, are well known, but existing designs are designed primarily for lifting a single carton. Typically, they approach a load with the clamp arms 34 spread wider than the load, maneuver so that the load is between the clamp arms 34 and then close the clamp arms 34 until they grasp the load. Then the load can be lifted and moved. However, the standard carton clamp design makes it problematic for the clamps to grasp two separate items or two separate stacks of items such as stacks of cartons, bales, or tires. If the items in the two stacks are not rectangular objects, clamping force is not likely to be transmitted from one stack to the other without inducing torque and rotation in one or more of the load objects, potentially twisting the objects off the stack.

BRIEF DESCRIPTION OF THE DRAWINGS

The present invention will be described by way of representative embodiments, illustrated in the accompanying drawings in which like references denote similar elements, and in which.

DETAILED DESCRIPTION

Before beginning a detailed description of the subject invention, mention of the following is in order. When appropriate, like reference materials and characters are used to designate identical, corresponding, or similar components in different figures.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming but would nevertheless be a routine undertaking of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference. Herein, "left" and "right" are from the perspective of an operator of a lift truck. Herein, "lateral" refers to directions to the left or the right and "longitudinal" refers to a direction perpendicular to the lateral direction and to a plane defined by the fork frame.

Those skilled in the art will recognize that numerous modifications and changes may be made to the various embodiments without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function, or property of the first embodiment is essential. Other embodiments are possible, their specific designs depending upon the particular application. As such, the scope of the invention should not be limited by the particular embodiments herein described but should be defined only by the appended claims and equivalents thereof.

First Embodiment Single-Double Load Clamp

Figure 1:
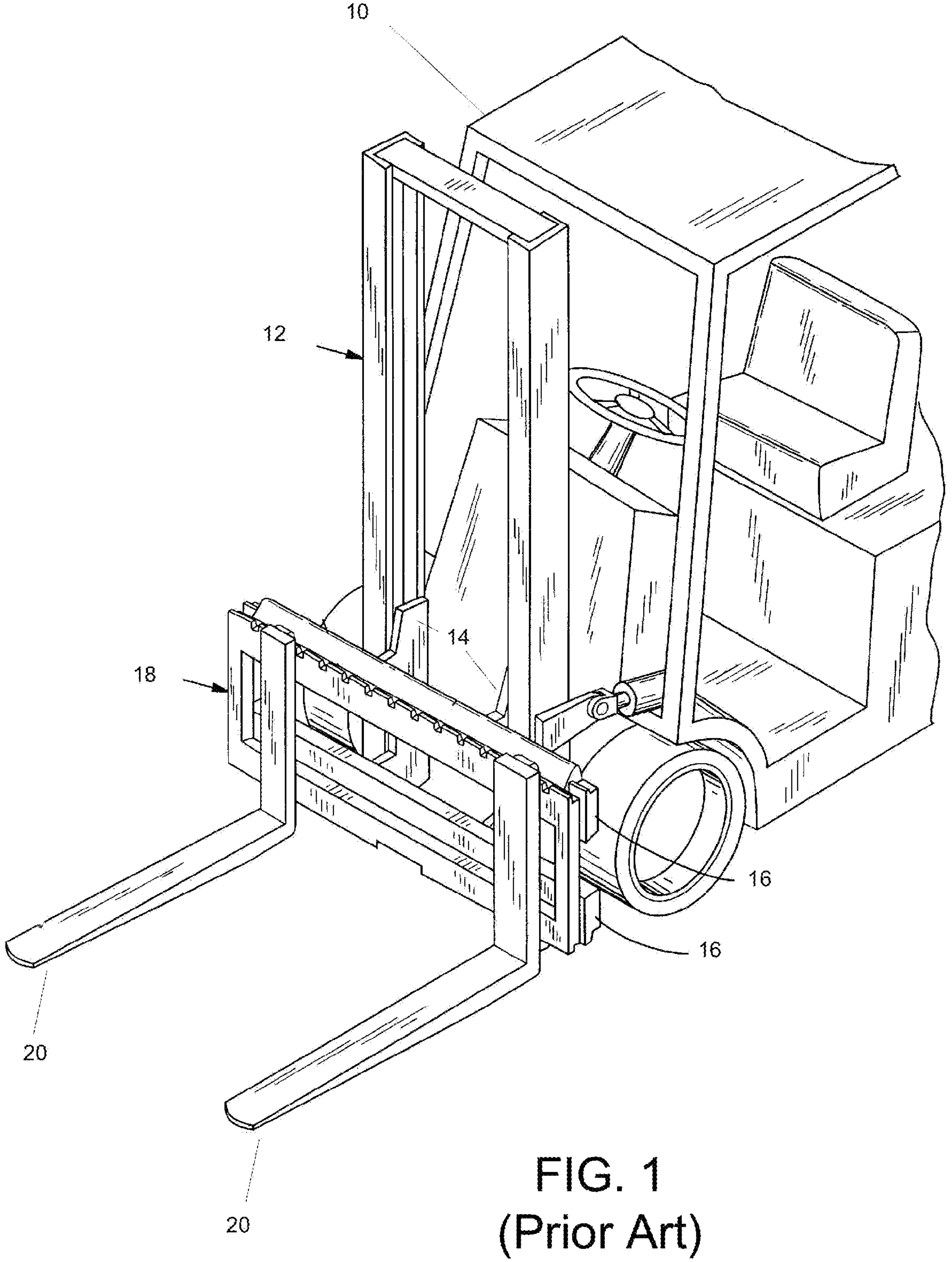
FIG. 1 (Prior Art)
FIG. 1 is an isometric view of a prior art lift truck, illustrating typical components of a lift truck equipped with forks.
Figure 2:
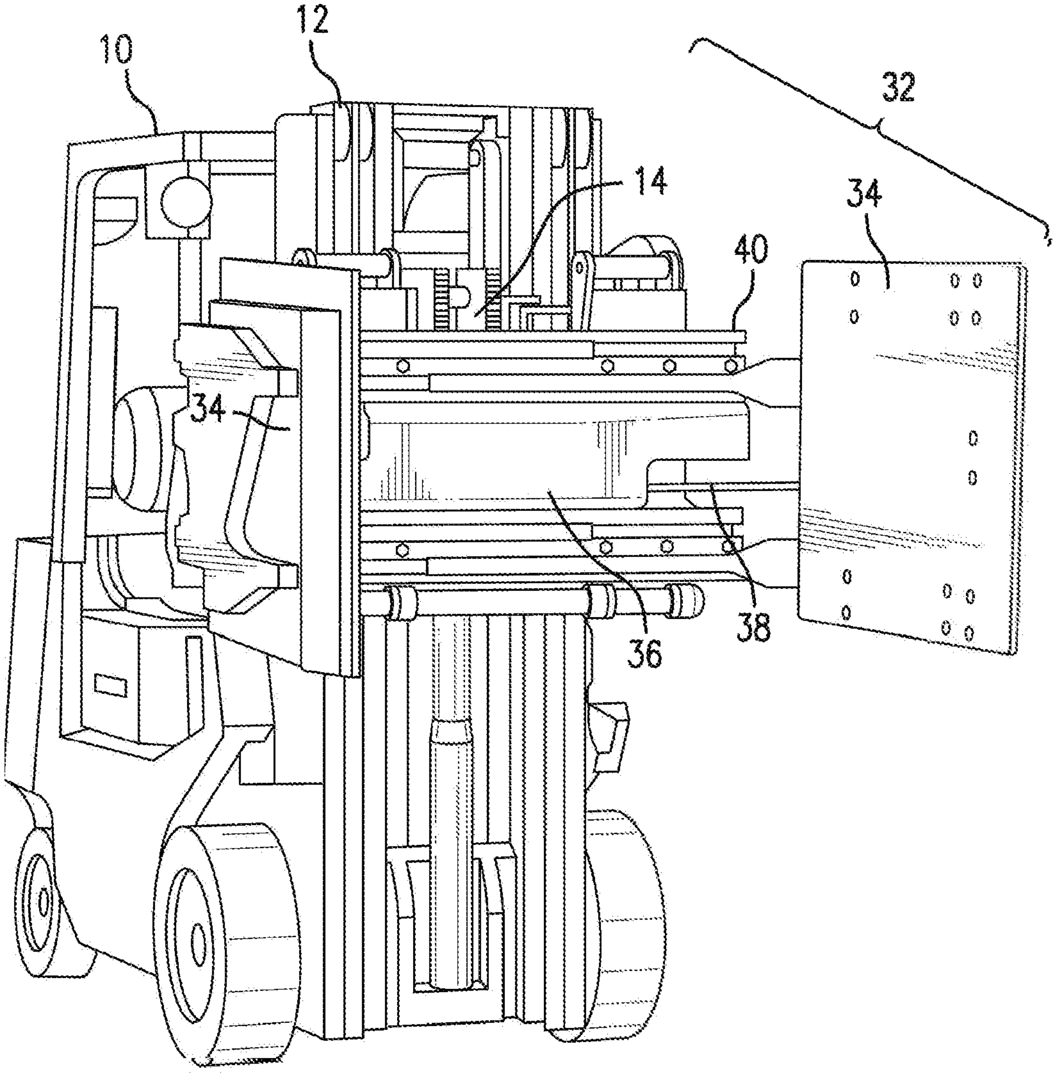
FIG. 2 (Prior Art)
FIG. 2 is an isometric view of a prior art lift truck, illustrating typical components of a lift truck equipped with a load clamp assembly.
Figure 3:
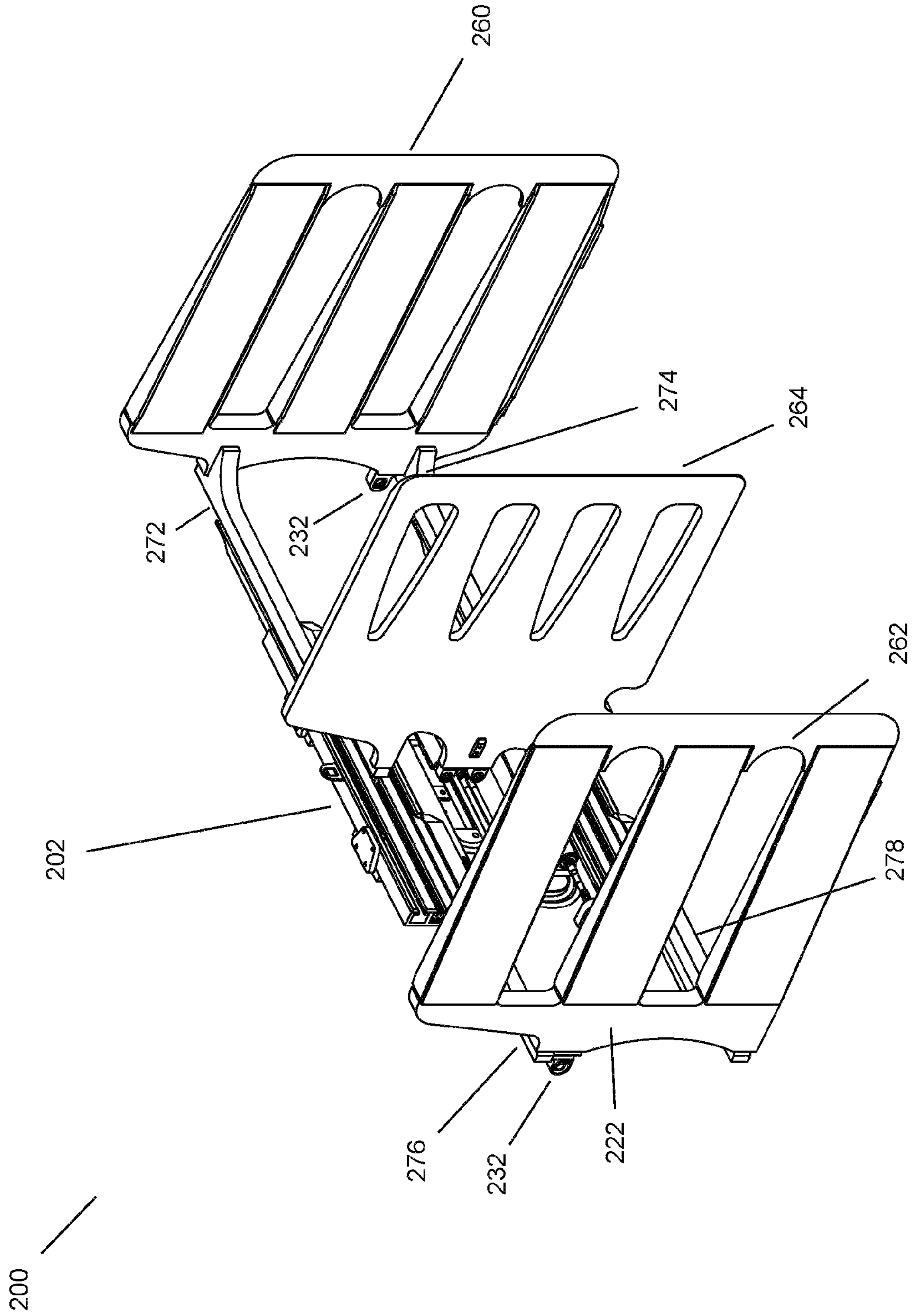
FIG. 3 is a front right isometric view of a first embodiment single-double load clamp 200.
Figure 4:
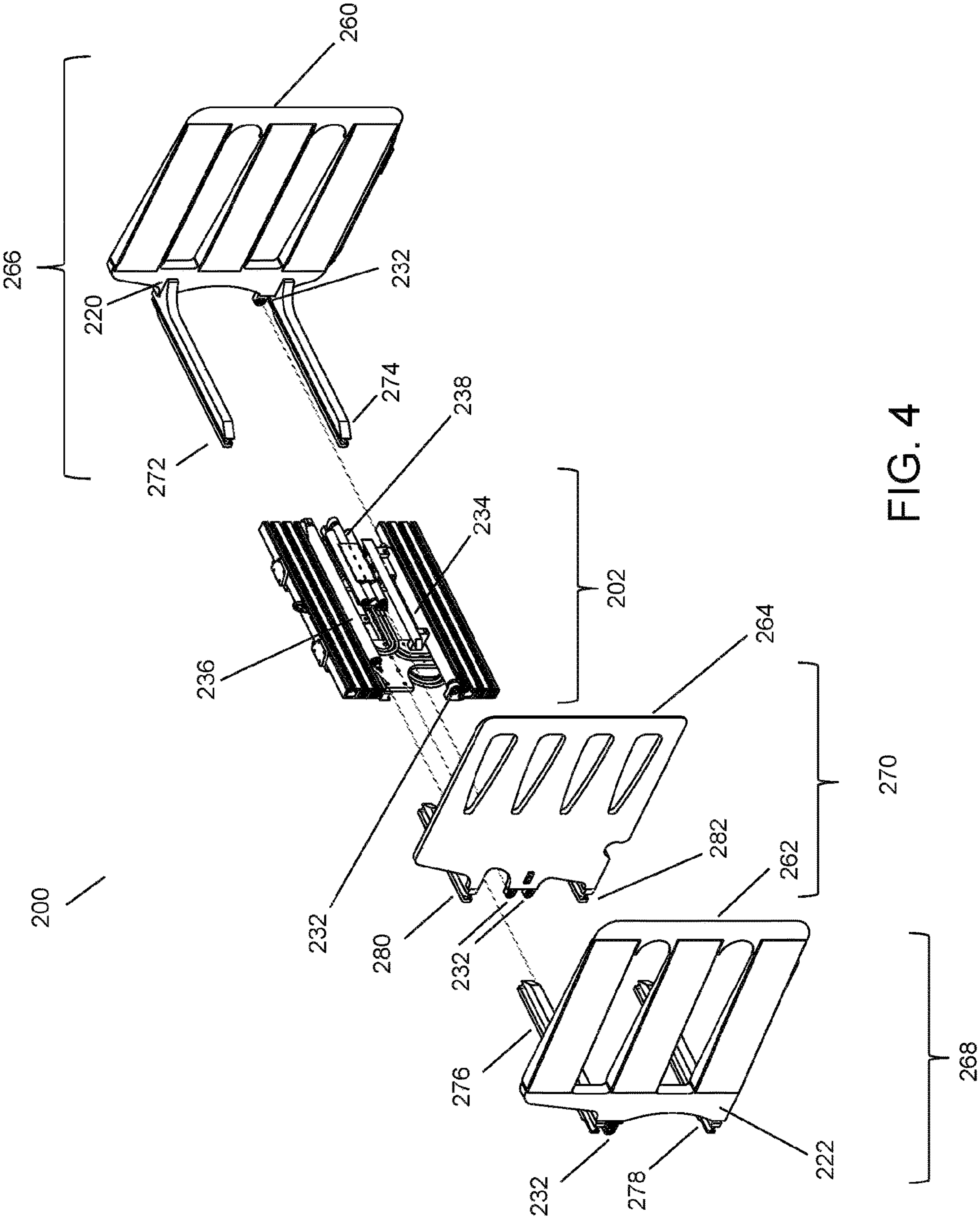
FIG. 4 is an exploded front right isometric view of the first embodiment single-double load clamp 200.

FIG. 3 shows a front right isometric view of a first embodiment single-double load clamp 200. FIG. 4 shows an exploded front right (viewed from the driver's perspective) isometric view of the first embodiment single-double load clamp 200. The first embodiment single-double load clamp 200 comprises a frame 202, a first (left) clamp arm 266, a second (right) clamp arm 268, a third (center) clamp arm 270. The frame 202 is configured to be coupled to a carriage 14 of a lift truck 10. In the first embodiment single-double load clamp 200, the first clamp arm 266 is on the left (viewed from the driver's perspective) and the second clamp arm 268 is on the right. The single double load clamp 200 has a first clamp actuator 234 attached to the frame 202 and to the first (left) clamp arm 266. The first embodiment single-double load clamp 200 has second clamp actuator 236 attached to the frame 202 and to the second (right) clamp arm 268. The first clamp actuator 234 and second clamp actuator 236 are configured to respectively pull the first clamp arm 266 and the second clamp arm 268 toward each other or push them away from each other. The first embodiment single-double load clamp 200 has a third clamp actuator 238 attached to the frame 202 and to the third (center) clamp arm 270. In the first embodiment 200, the third clamp actuator 238 is a telescoping actuator. In the first embodiment 200, the third clamp actuator 238 is a hydraulic telescoping actuator with a center actuator 242 attached to an upper actuator 244 and a lower actuator 246 (see FIG. 5). The base sides of each of the center actuator 242, the upper actuator 244, and the lower actuator 246 are all hydraulically connected and the rod sides of each of the center actuator 242, the upper actuator 244, and the lower actuator 246 are all hydraulically connected. The center actuator 242 is attached to the frame 202 via an actuator bracket 232. The upper actuator 244 and the lower actuator 246 are attached to the third clamp arm 270, each with their own actuator bracket 232. In alternative embodiments, the center actuator 242 is attached to the third clamp arm 270 via an actuator bracket 232 and the upper actuator 244 and the lower actuator 246 are attached to the frame 202, each with their own actuator bracket 232. The first embodiment single-double load clamp 200 is configured for telescoping action of the third clamp actuator 238 in which each of the three actuators 242, 244, 246 of the third clamp actuator 238 have a rod that extends and retracts in synchronization with the other two rods. The telescoping action allows the third clamp arm 270 to move twice as far as each of the three rods move individually, allowing for the third clamp actuator 238 to be half the length as a single cylinder actuator would be for the same rod stroke.

In some alternative embodiments, the third clamp actuator 238 is a telescoping actuator with three concentric cylinders that share the same axis. In some alternative embodiments, an inner cylinder nests slidingly within a middle cylinder, which nests slidingly withing an outer cylinder. The outer cylinder is fixed to the frame 202 and has a base hydraulic line connection. A piston with a rod are slidingly positioned within the inner cylinder and the rod is connected to the third clamp arm 270. A rod hydraulic line is connected to the inner cylinder on the rod side of the piston. In some alternative embodiments, the middle cylinder is omitted and the inner cylinder nests slidingly within the outer cylinder. In some alternative embodiments, the rod is omitted, the piston is fixed in the middle cylinder at an end farthest from the third clamp arm 270 and inner cylinder is directly coupled to the third clamp arm 270.

In some alternative embodiments, the third clamp actuator is an electrical telescoping actuator.

Figure 13:
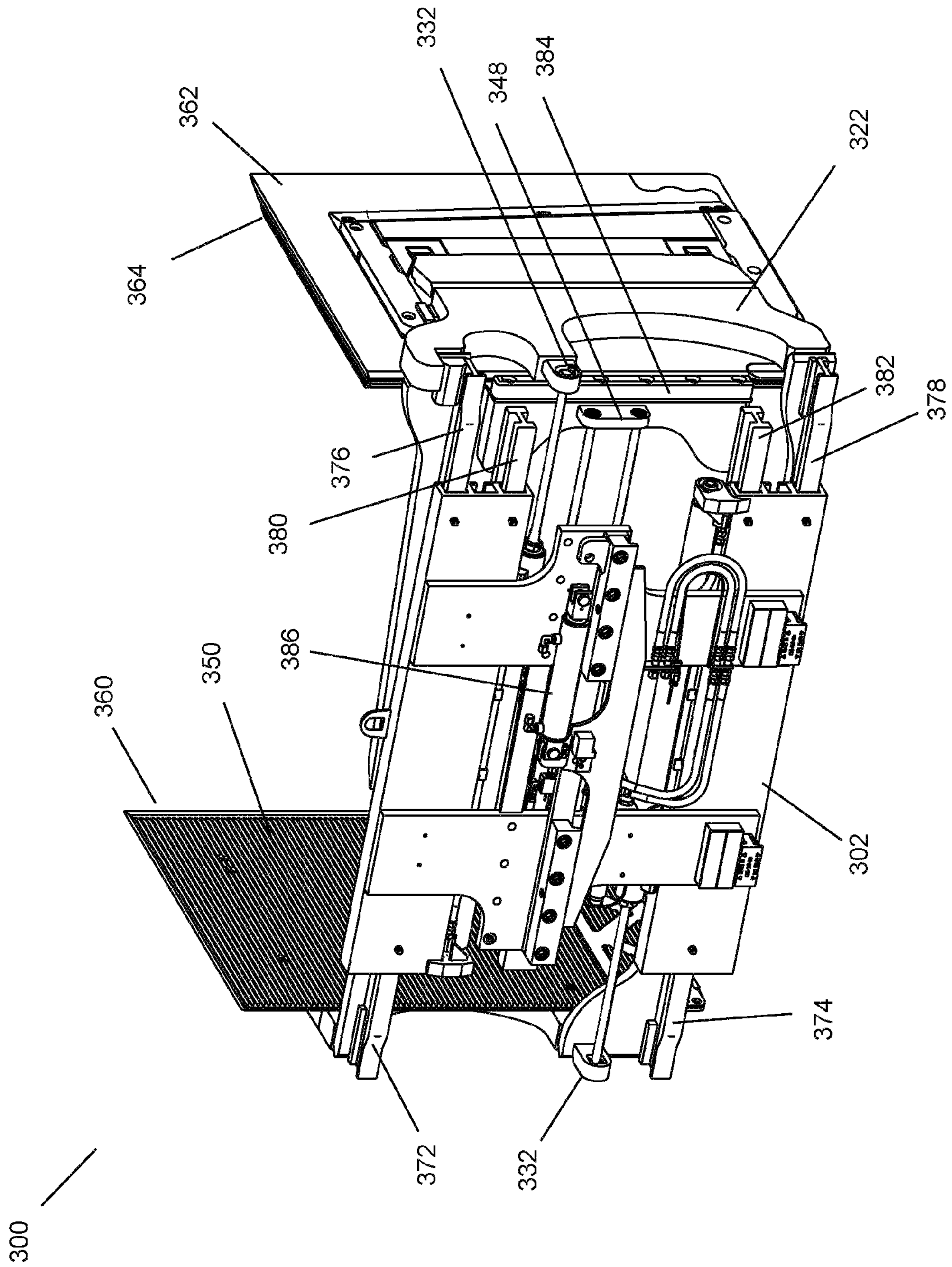
FIG. 13 shows a rear right isometric view of a second embodiment single-double load clamp 300.

In the first embodiment single-double load clamp 200, the side shift function is provided by a separate side-shift actuator (not shown in first embodiment 200, but similar to the side-shift actuator 386 in the second embodiment 300—see FIG. 13) that moves the frame 302 laterally relative to the carriage 14. In some alternative embodiments, a single-double load clamp is further configured for the first and second actuators 234, 236 to act in tandem to provide a small amount of side shift to the first and second clamp arms 266, 268, allowing an operator approaching a load with a lift truck 10 to make a small adjustment lateral of the left and right clamp arms 266, 268 if the lift truck 10 is not perfectly lined up with the load. In some alternative embodiments, a single-double load clamp is configured to move the first clamp arm 266 when in a single load mode of operation, but the second clamp arm 268 is configured to remain stationary.

Figure 5:
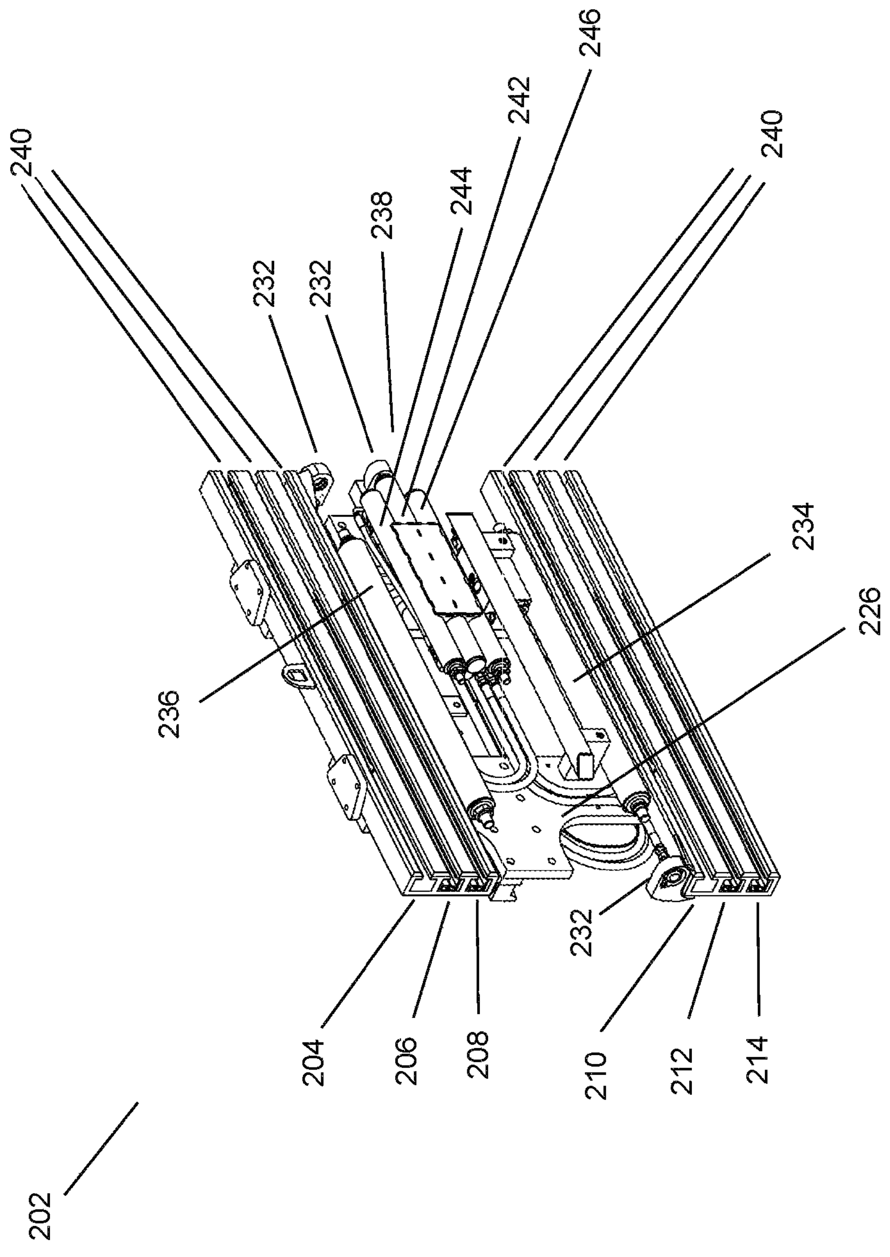
FIG. 5 is a front right isometric view of the frame 202 of the first embodiment single-double load clamp 200.
Figure 6B:
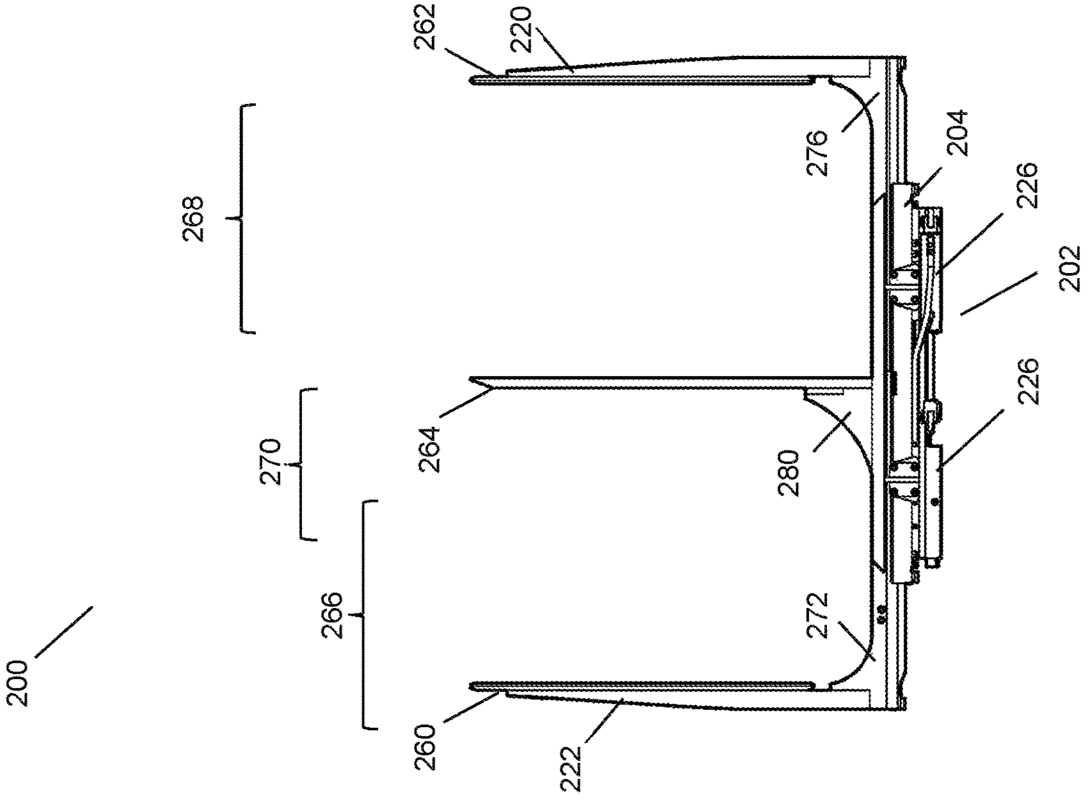
FIG. 6B shows a top view of the first embodiment single-double load clamp 200 in a double load mode, in an open configuration.
Figure 6A:
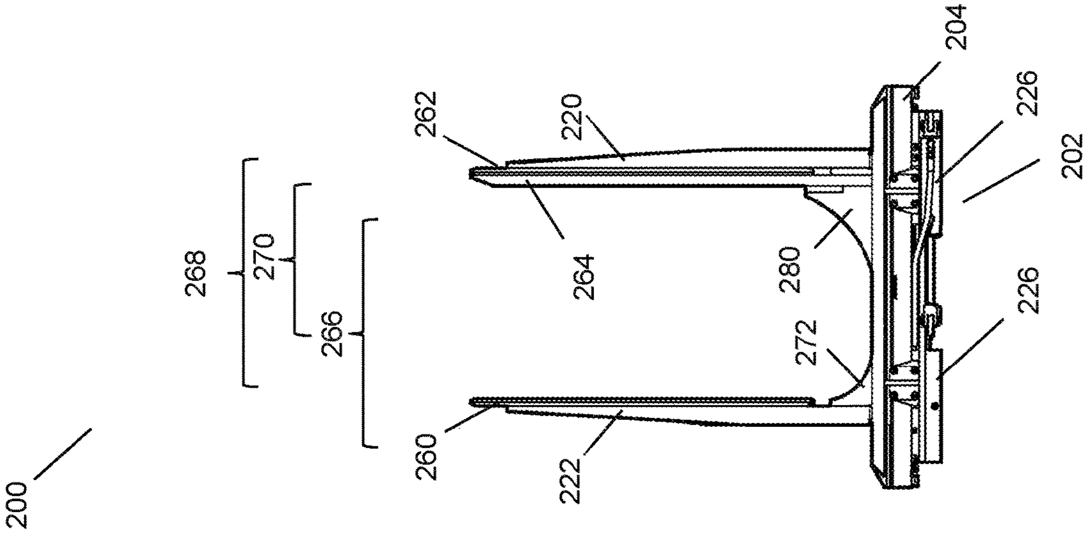
FIG. 6A shows a top view of the first embodiment single-double load clamp 200 in a single load mode, in a closed configuration.

FIG. 5 shows a front right isometric view of the frame 202 of the first embodiment single-double load clamp 200. The frame 202 comprises three upper guide channels (204, 206, 208) and three lower guide channels (210, 212, 214) coupled to two frame vertical beams 226. A first guide channel 204 is positioned near a top of the frame 202, with a second guide channel 206 below and a third guide channel 208 below that. A sixth guide channel 214 is positioned near the bottom of the frame 202 with a fifth guide channel 212 above and a fourth guide channel 210 above that. The frame 202 has a gap between the upper guide channels (204, 206, 208) and the lower guide channels (210, 212, 214). In the first embodiment single-double load clamp 200, the upper guide channels (204, 206, 208) are in contact with each other and the lower guide channels (210, 212, 214) are in contact with each other. In some embodiments, some of the upper guide channels (204, 206, 208) share common walls and in some embodiments and some of the lower guide channels (210, 212, 214) share common walls. However, in other embodiments, the upper guide channels (204, 206, 208) and the lower guide channels (210, 212, 214) do not all have common walls. The frame 202 has three actuator brackets 232, one actuator bracket 232 coupled to frame vertical beam 226 on the left, one actuator bracket 232 coupled to a bottom of the third guide channel 208 on the left and coupled to the second clamp actuator 236, and the other actuator bracket 232 coupled to a top of the fourth guide channel 210 on the right and coupled to the first clamp actuator 234. The single-double load clamp 200 is in a closed configuration when the left and right clamp arms 266, 268 are as close together as the actuators 234, 236 can pull them. The single-double load clamp 200 is in an open configuration when the left and right clamp arms 266, 268 are as far apart as the actuators 234, 236 can push them.

Each of the guide channels (204, 206, 208, 210, 212, 214) has a guide channel cavity, open at the ends. Each of the guide channels (204, 206, 208, 210, 212, 214) has a guide slot 240 on the front, opening to the guide channel cavity. In some embodiments, each of the guide channels (204, 206, 208, 210, 212, 214) has a channel bearing, positioned inside the guide channel cavity, and shaped to conform thereto, and with its own interior cavity that is similarly shaped, but slightly smaller. Each channel bearing is detachably coupled to its respective guide channel (204, 206, 208, 210, 212, 214). In the first embodiment 200, each channel bearing is detachably coupled to its respective guide channel (204, 206, 208, 210, 212, 214) with a removable fastener scheme such as cap screws and nuts, but in other embodiments, other fastening schemes may be used. The channel bearings comprise suitable bearing material that provides low friction and are softer than the components with which they have sliding contact in order to preferentially wear. Since the channel bearings are removable, they can be easily replaced when worn down.

The first (left) clamp arm 266 (see FIG. 4) comprises a first (left) clamp plate 260 coupled via a first (left) clamp arm bracket 220 to a first (upper left) sliding beam 272 and to a second (lower left) sliding beam 274. The first (upper left) sliding beam 272 and the second (lower left) sliding beam 274 extend inwardly from the first (left) clamp plate 260 towards the right (from the driver's perspective). The first (upper left) sliding beam 272 is slidingly inserted into the first guide channel 204 (the uppermost of the upper guide channels) and the second (lower left) sliding beam 274 is slidingly inserted into the fourth guide channel 210 (the uppermost of the lower guide channels). The first (left) clamp arm 266 has an actuator bracket 232 coupled to the first (left) clamp arm bracket 220 and coupled to the first clamp actuator 234.

The second (right) clamp arm 268 (see FIG. 4) comprises a second (right) clamp plate 262 coupled via a second (right) clamp arm bracket 222 to a third (upper right) sliding beam 276 and to a fourth (lower right) sliding beam 278. The third (upper right) sliding beam 276 and the fourth (lower right) sliding beam 278 extend inwardly from the second (right) clamp plate 262 towards the left (from the driver's perspective). The third (upper right) sliding beam 276 is slidingly inserted into the third guide channel 208 (the lowermost of the upper guide channels) and the fourth (lower right) sliding beam 278 is slidingly inserted into the sixth guide channel 214 (the lowermost of the lower guide channels). The second (right) clamp arm 268 has an actuator bracket 232 coupled to the second (right) clamp arm bracket 222 and coupled to the second clamp actuator 236.

The third (center) clamp arm 270 (see FIG. 4) comprises a third (center) clamp plate 264 coupled to a fifth (center upper) sliding beam 280 and a sixth (center lower) sliding beam 282. The sliding beams 280, 282 of the third (center) clamp arm 270 extend to the left from a rear of the third (center) clamp plate 264 (when viewed from the driver's perspective). In alternative embodiments, the sliding beams 280, 282 of the third (center) clamp arm 270 extend to the right instead of the left and the third clamp actuator 238 is repositioned from the left side of the frame 202 to the right side. The fifth (center upper) sliding beam 280 is slidingly inserted into the second guide channel 206 (the middle one of the upper guide channels) and the sixth (center lower) sliding beam 282 is slidingly inserted into the fifth guide channel 212 (the middle one of the lower guide channels). The third (center) clamp plate 264 is shown with cut-outs for weight reduction, but they may be omitted in other embodiments. The thickness of the third clamp plate 264 is sufficient to transmit all the force required to clamp and carry a load on one side of the third clamp plate 264 but no load on the other side without damaging the third clamp plate 264. In the first embodiment, the third clamp plate 264 has an average thickness of at least an inch, preferable 1.25 inches, with a taper or bevel on the leading edge. In alternative embodiments, the guide channels (206, 208) for the sliding beams (280, 282) of the third (center) clamp arm 270 are on the second (right) clamp arm 268 instead of the frame 202.

In some alternative embodiments, guide channels 204, 206, 208, 210, 212, 214 may be arranged differently than in the first embodiment single-double load clamp 200, with the necessary adjustments made to the components of the clamp arms 266, 268, 270. For example, in some embodiments, the first guide channel 204 is the middle of the upper guide channels, the second guide channel 206 is the lower of the upper guide channels, and the third guide channel 208 is the upper of the upper guide channels. Likewise, the fourth guide channel 210 is the middle of the lower guide channels, the fifth guide channel 212 is the lower of the lower guide channels, and the sixth guide channel 214 is the upper of the lower guide channels. The first sliding beam 272 is still slidingly inserted into first guide channel 204, the second sliding beam 274 into the fourth guide channel 210, the third sliding beam 276 into third guide channel 208, the fourth sliding beam 278 into the sixth guide channel 214, the fifth sliding beam 280 into the second guide channel 206 and the sixth sliding beam 282 into the fifth guide channel 212. The coupling of the first sliding beam 272 and second sliding beam 274 with the first (left) clamp plate 260, the coupling of the third sliding beam 276 and fourth sliding beam 278 with the second (right) clamp plate 262, and the coupling of the fifth sliding beam 280 and the sixth sliding beam 282 with the third (center) clamp plate 264 are all shifted to preserve alignment between the first (left) clamp plate 260, the second (right) clamp plate 262 and the third (center) clamp plate 264.

In some alternative embodiments, the first clamp arm 266 is on the right (when viewed from the driver's perspective) with its first sliding beam 272 and its second sliding beam 274 extending inwardly from the first (left) clamp plate 260 towards the left with the necessary adjustments made to the components of the clamp arms 266, 268, 270. The second clamp arm 268 is on the left (when viewed from the driver's perspective) with its third sliding beam 276 and the fourth sliding beam 278 extending inwardly from the second (right) clamp plate 262 towards the right. The third (center) clamp arm 270 remains in the center but its sliding beams 280, 282 extend to the right from the rear of the third (center) clamp plate 264 (when viewed from the driver's perspective).

In some alternative embodiments, the third (center) clamp arm 270 is fixed to the frame 202 and remains stationary during clamping operations. In some of such embodiments, the bearings inside the second guide channel 206 and the fifth guide channel 212 maybe omitted. In some such embodiments, the second guide channel 206 and the fifth guide channel 212 are themselves omitted.

In the first embodiment single-double load clamp 200, the first, second, and third clamp arms (266, 268, 270) do not have clamp pads coupled to an inside surface of their clamp plates (260, 262, 264). However, in other embodiments one or more of the first, second, and third clamp arms (266, 268, 270) may have one or more clamp pads attached made of rubber or some other suitable resilient material.

Second Embodiment Single-Double Load Clamp

Figure 7:
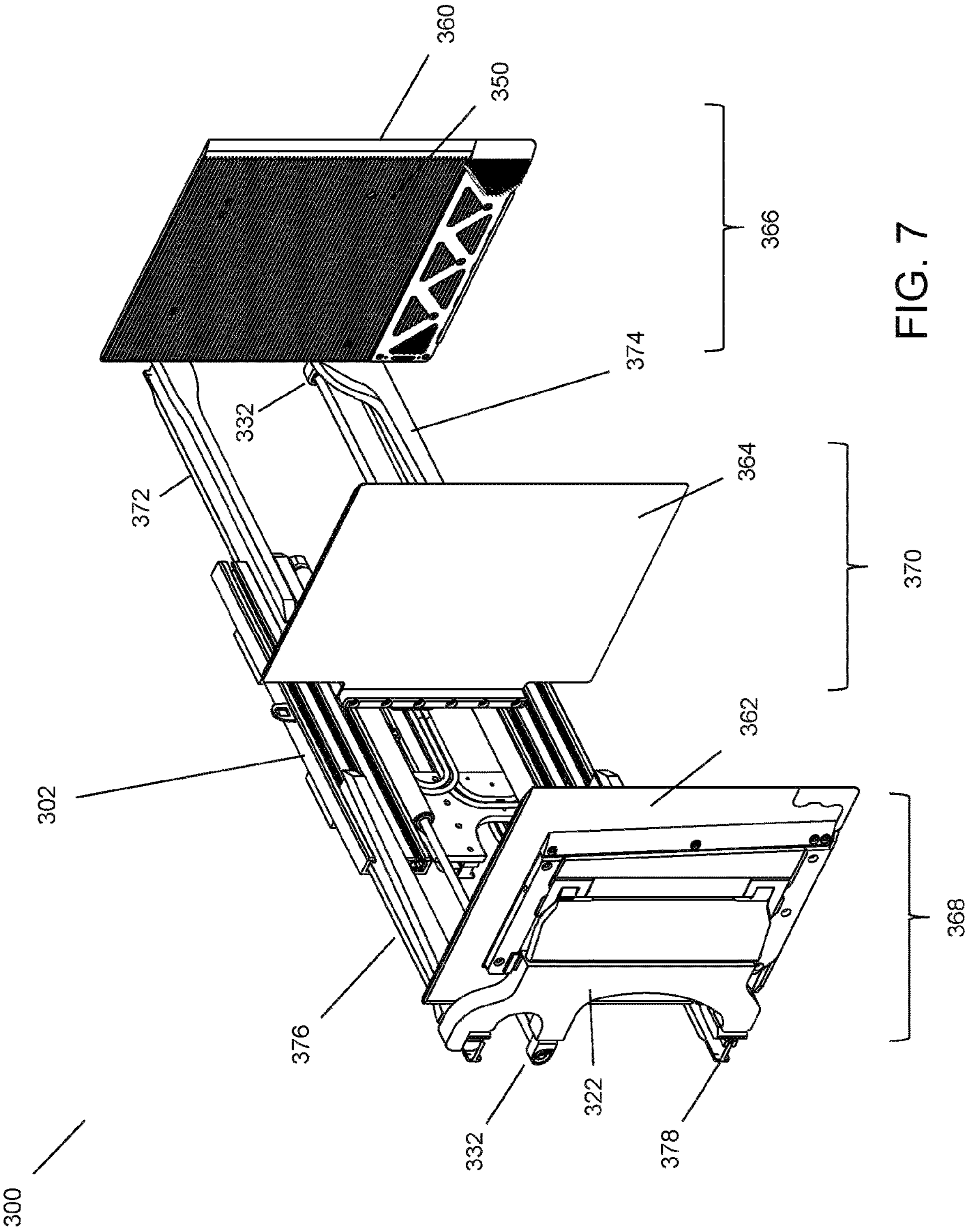
FIG. 7 shows a front right isometric view of a second embodiment single-double load clamp 300.
Figure 8:
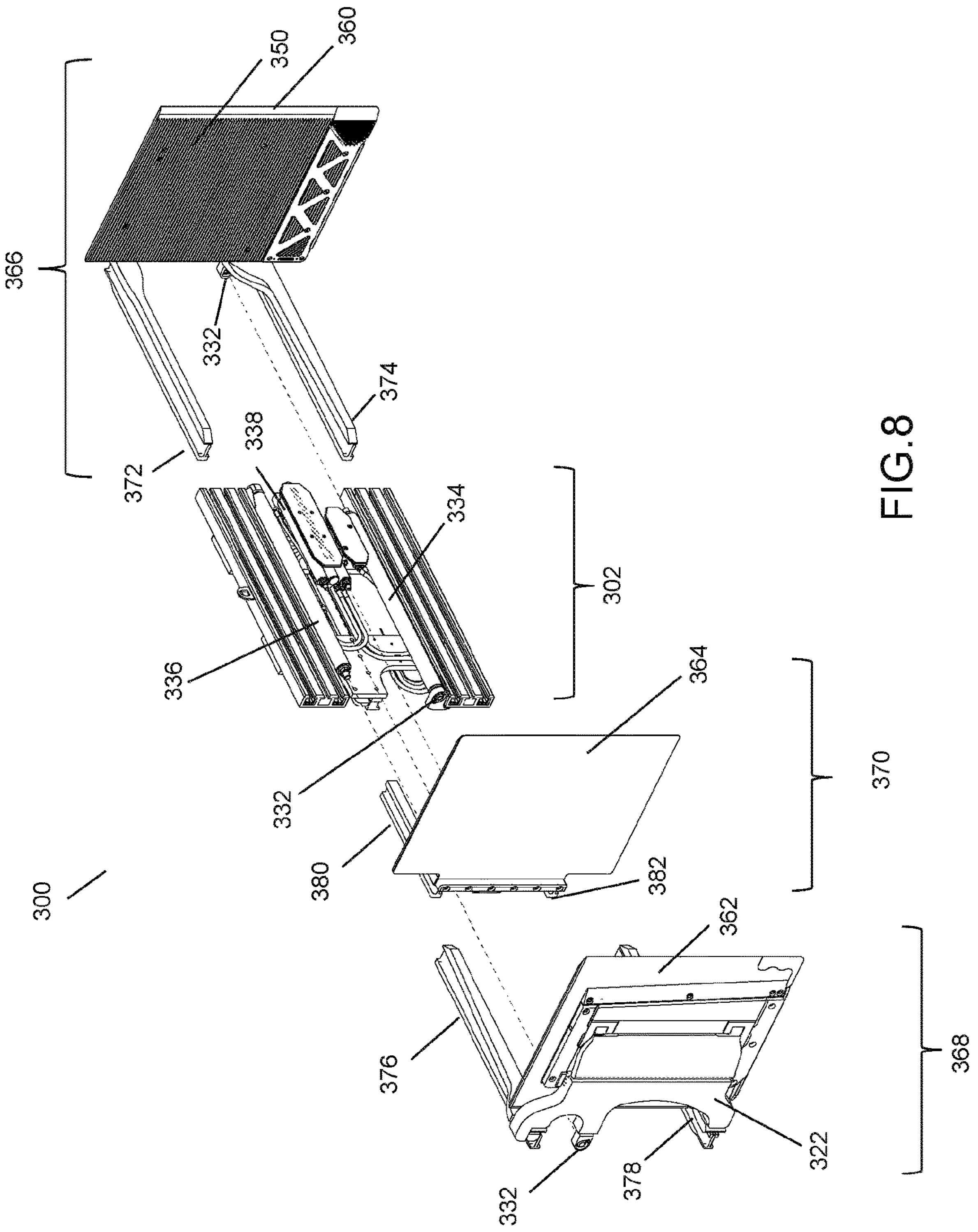
FIG. 8 shows an exploded front right isometric view of the second embodiment single-double load clamp 300.

FIG. 7 shows a front right (viewed from the driver's perspective) isometric view of a second embodiment single-double load clamp 300. FIG. 8 shows an exploded front right isometric view of the second embodiment single-double load clamp 300. FIG. 13 shows a rear right isometric view of the second embodiment single-double load clamp 300. The second embodiment single-double load clamp 300 comprises a frame 302, a first (left) clamp arm 366 with a first clamp plate 360, a second (right) clamp arm 368 with a second clamp plate 362, a third (center) clamp arm 370 with a third clamp plate 364. The primary difference between the second embodiment single-double load clamp 300 and the first embodiment single-double load clamp 200 is that the third clamp plate 364 of the second embodiment 300 is thinner than the third clamp plate 264 of the first embodiment 200 and thinner than the first clamp plate 360 and second clamp plate 362 of the second embodiment 300.

The frame 302 is configured to be coupled to a carriage 14 of a lift truck 10. In the second embodiment single-double load clamp 300, the first clamp arm 366 is on the left (viewed from the driver's perspective) and the second clamp arm 368 is on the right. The second embodiment single-double load clamp 300 has a first clamp actuator 334 attached to the frame 302 and to the first (left) clamp arm 366. The second embodiment single-double load clamp 300 has second clamp actuator 336 attached to the frame 302 and to the second (right) clamp arm 368. The second embodiment single-double load clamp 300 is configured for the first clamp actuator 334 and second clamp actuator 336 to respectively pull the first clamp arm 366 and the second clamp arm 368 toward each other or push them away from each other. The single-double load clamp 300 has a third clamp actuator 338 attached to the frame 302 and to the third (center) clamp arm 370. In the second embodiment 300, the third clamp actuator 338 is a telescoping actuator with a center actuator 342 attached to an upper actuator 344 and a lower actuator 346. The base sides of each of the center actuator 342, the upper actuator 344, and the lower actuator 346 are all hydraulically connected and the rod sides of each of the center actuator 342, the upper actuator 344, and the lower actuator 346 are all hydraulically connected. The center actuator 342 is attached to the frame 302 via an actuator bracket 332. The upper actuator 344 and the lower actuator 346 are attached to the third clamp arm 370, each with their own actuator bracket 332. In alternative embodiments, the center actuator 342 is attached to the third clamp arm 370 via an actuator bracket 332 and the upper actuator 344 and the lower actuator 346 are attached to the frame 302, each with their own actuator bracket 332. The third clamp actuator 338 is configured for telescoping action in which each of the three actuators 342, 344, 346 of the third clamp actuator 338 have a rod that extends and retracts in synchronization with the other two rods. The telescoping action allows the third clamp arm 370 to move twice as far as each of three rods moves, allowing for the third clamp actuator 338 to be half the length as a single cylinder actuator would be for the same rod stroke.

Figure 9:
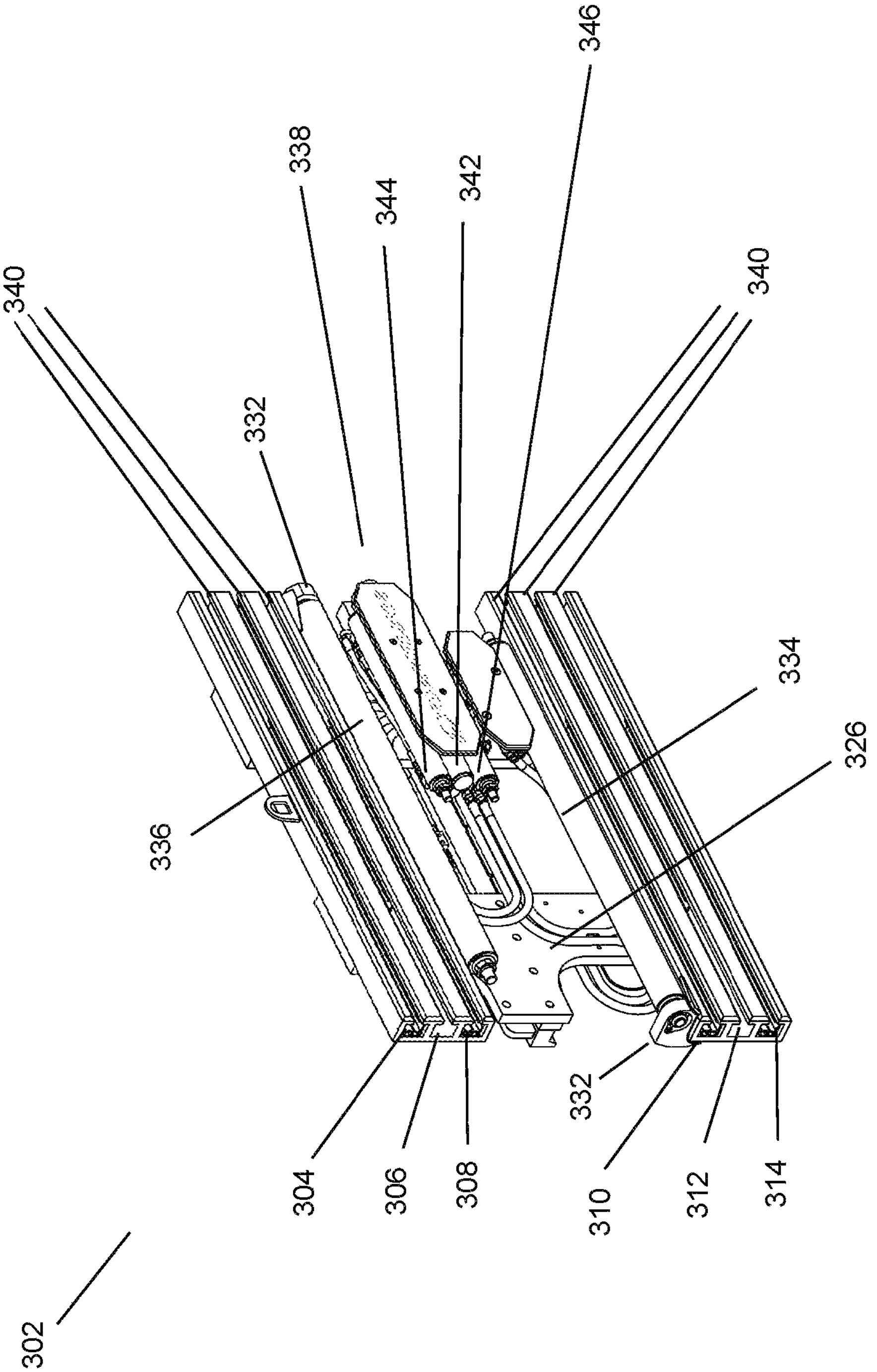
FIG. 9 shows a front right isometric view of the frame 302 of the second embodiment single-double load clamp 300.

FIG. 9 shows a front right isometric view of the frame 302 of the second embodiment single-double load clamp 300. The frame 302 comprises three upper guide channels (304, 306, 308) and three lower guide channels (310, 312, 314) coupled to two frame vertical beams 326. A first guide channel 304 is positioned near a top of the frame 302, with a second guide channel 306 below and a third guide channel 308 below that. A sixth guide channel 314 is positioned near the bottom of the frame 302 with a fifth guide channel 312 above and a fourth guide channel 310 above that. The frame 302 has a gap between the upper guide channels (304, 306, 308) and the lower guide channels (310, 312, 314). In the second embodiment single-double load clamp 300, the upper guide channels (304, 306, 308) are in contact with each other and the lower guide channels (310, 312, 314) are in contact with each other. In some embodiments, some of the upper guide channels (304, 306, 308) share common walls and in some embodiments, some of the lower guide channels (310, 312, 314) share common walls. However, in other embodiments, the upper guide channels (304, 306, 308) and the lower guide channels (310, 312, 314) do not all have common walls. The frame 302 has three actuator brackets 332, one actuator bracket 332 coupled to the frame vertical beam 326 on the left, one actuator bracket 332 coupled to a bottom of the third guide channel 308 on the left and coupled to the second clamp actuator 336, and the other actuator bracket 332 coupled to a top of the fourth guide channel 310 on the right and coupled to the first clamp actuator 334. The single-double load clamp 300 is in a closed configuration when the left and right clamp arms 366, 368 are as close together as the actuators 334, 336 can pull them. The single-double load clamp 300 is in an open configuration when the left and right clamp arms 366, 368 are as far apart as the actuators 334, 336 can push them.

Each of the guide channels (304, 306, 308, 310, 312, 314) has a guide channel cavity, open at the ends. Each of the guide channels (304, 306, 308, 310, 312, 314) has a guide slot 340 on the front, opening to the guide channel cavity. In some embodiments, each of the guide channels (304, 306, 308, 310, 312, 314) has a channel bearing, positioned inside the guide channel cavity, and shaped to conform thereto, and with its own interior cavity that is similarly shaped, but slightly smaller. Each channel bearing is detachably coupled to its respective guide channel (304, 306, 308, 310, 312, 314). In the second embodiment 300, each channel bearing is detachably coupled to its respective guide channel (304, 306, 308, 310, 312, 314) with a removable fastener scheme such as cap screws and nuts, but in other embodiments, other fastening schemes may be used. The channel bearings comprise suitable bearing material that provides low friction and are softer than the components with which they have sliding contact in order to preferentially wear. Since the channel bearings are removable, they can be easily replaced when worn down.

Figure 10B:
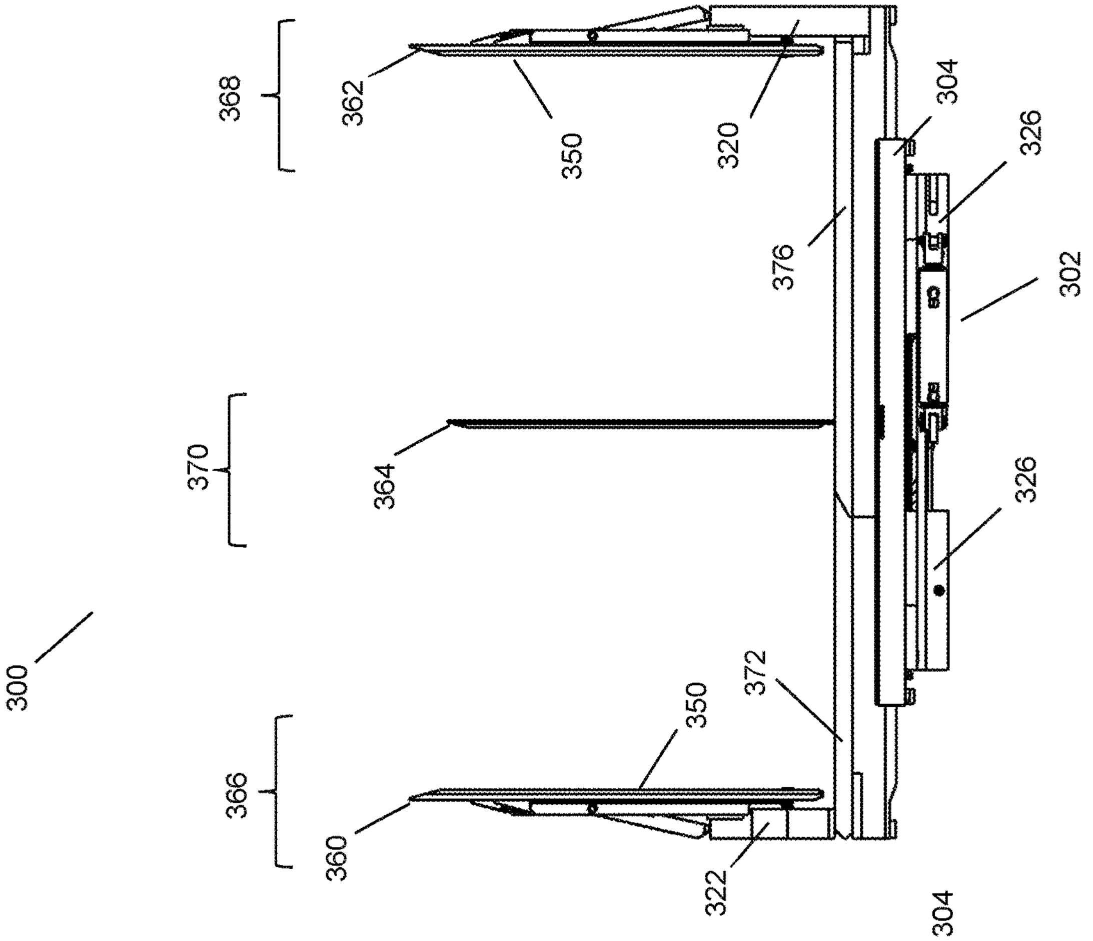
FIG. 10B shows a top view of the second embodiment single-double load clamp 300 in a double load mode, in an open configuration.
Figure 10A:
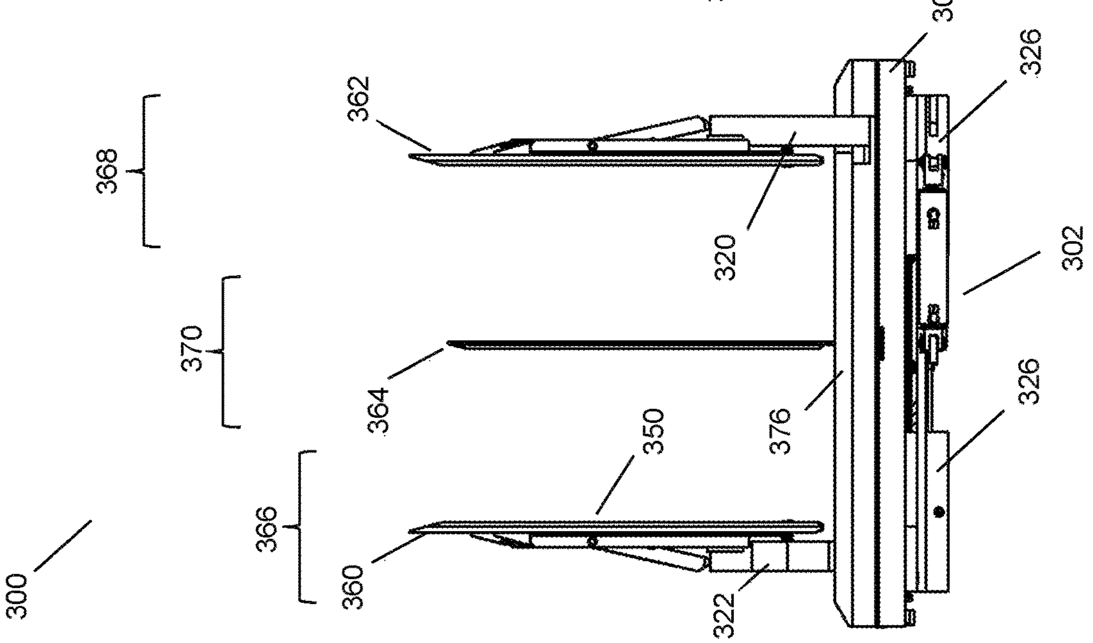
FIG. 10A shows a top view of the second embodiment single-double load clamp 300 in a double load mode, in a closed configuration.

The first (left) clamp arm 366 (see FIG. 8) comprises a first (left) clamp plate 360 coupled via a first (left) clamp arm bracket 320 (see FIGS. 10A and 10B) to a first (upper left) sliding beam 372 and to a second (lower left) sliding beam 374. The first (upper left) sliding beam 372 and the second (lower left) sliding beam 374 extend inwardly from the first (left) clamp plate 360 towards the right (from the driver's perspective). The first (upper left) sliding beam 372 is slidingly inserted into the second guide channel 306 (the middle one of the upper guide channels) and the second (lower left) sliding beam 374 is slidingly inserted into the fifth guide channel 312 (the middle one of the lower guide channels). The first (left) clamp arm 366 has an actuator bracket 332 coupled to the first (left) clamp arm bracket 320 and coupled to the first clamp actuator 334.

The second (right) clamp arm 368 (see FIG. 8) comprises a second (right) clamp plate 362 coupled via a second (right) clamp arm bracket 322 to a third (upper right) sliding beam 376 and to a fourth (lower right) sliding beam 378. The third (upper right) sliding beam 376 and the fourth (lower right) sliding beam 378 extend inwardly from the second (right) clamp plate 362 towards the left (from the driver's perspective). The third (upper right) sliding beam 376 is slidingly inserted into the first guide channel 304 (the uppermost of the upper guide channels) and the fourth (lower right) sliding beam 378 is slidingly inserted into the sixth guide channel 314 (the lowermost of the lower guide channels). The second (right) clamp arm 368 has an actuator bracket 332 coupled to the second (right) clamp arm bracket 322 and coupled to the second clamp actuator 336.

Figure 12:
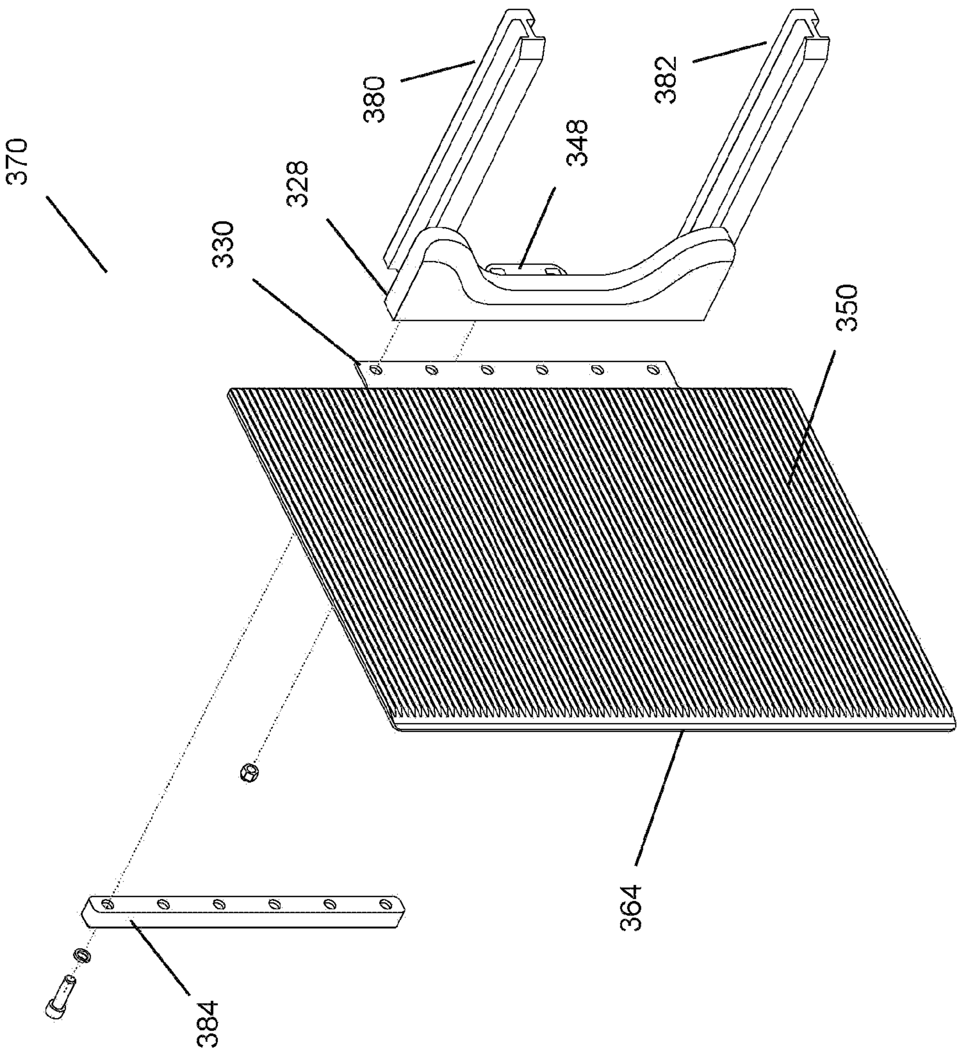
FIG. 12 shows an exploded front left isometric view of the third (center) clamp arm 370 of the second embodiment single-double load clamp 300.

The third (center) clamp arm 370 (see FIGS. 8 and 12) comprises a third (center) clamp plate 364 coupled via a third clamp arm bracket 328 to a fifth (center upper) sliding beam 380 and a sixth (center lower) sliding beam 382. The third clamp arm bracket 328 couples to a third arm attachment bar 384 through a third clamp plate tab 330 extended from the rear of the third clamp plate 364. The third arm attachment bar 384 secures to the third clamp arm bracket 328 with fasteners passing through the third clamp plate tab 330. The sliding beams 380, 382 of the third (center) clamp arm 370 extend toward the second clamp arm 368 (right) from the third clamp arm bracket 328. In alternative embodiments, the sliding beams 380, 382 of the third (center) clamp arm 370 extend toward the first clamp arm 366 (left) instead toward the second clamp arm 368 (right) and the third clamp actuator 338 is repositioned from the right side of the frame 302 to the left side. The fifth (center upper) sliding beam 380 is slidingly inserted into the third guide channel 308 (the lowermost of the upper guide channels) and the sixth (center lower) sliding beam 382 is slidingly inserted into the fourth guide channel 310 (the uppermost of the lower guide channels). The third (center) clamp arm 370 has a double actuator bracket 348 coupled to the third clamp arm bracket 328 and coupled to the upper and lower actuators of the third clamp actuator 338.

The third clamp plate 364 has a minimal thickness, only enough to prevent shearing within each of the loads when inserted between two loads to be clamped (e.g., two stacks of cartons). The thickness of the third clamp plate 364 may not be sufficient to transmit the force required to clamp and carry a load only on one side of the third clamp plate 364 but not the other, at least not without damaging the third clamp plate 364. Hence, the second embodiment single-double load clamp 300 should not be used to clamp a single load in the double load mode—i.e., with a load between the third (center) clamp plate 364 and one of the flanking clamp plates 360, 362, but no load between the third (center) clamp plate 364 and the other of the flanking clamp plates 360, 362. In the second embodiment single-double load clamp 300, the third clamp plate 364 is everywhere thinner than the first clamp plate 360 or the second clamp plate 362. In some alternative embodiments, the third clamp plate 364 is on average thinner than the first clamp plate 360 or the second clamp plate 362. In some alternative embodiments, the third clamp plate 364 is everywhere no more than half the thickness of the first clamp plate 360 or the second clamp plate 362. In some alternative embodiments, the third clamp plate 364 is on average no more than half the thickness of the first clamp plate 360 or the second clamp plate 362.

In the second embodiment 300, the third clamp plate 364 is at least half an inch thick in most places, no more than 1 inch, preferably 9/16 of an inch. The third clamp plate 364 has a taper or bevel on the leading edge.

In the second embodiment single-double load clamp 300, the first (left) clamp arm 366 and second (right) clamp arm 368 and the third clamp arm 370 each have a clamp pad 350 coupled to an inside surface of their respective clamp plates 360, 362, 364. In the second embodiment 300, the clamp pad 350 is a rubber sheet with horizontal groves, but in other embodiments may be some other suitable material. In some other embodiments one or more of the clamp arms 366, 368, 370 do not have a clamp pad 350. In some other embodiments, the third (center) clamp arm 370 has sprayed on rubber coating.

Hydraulic System for Single-Double Load Clamp

Figure 14A:
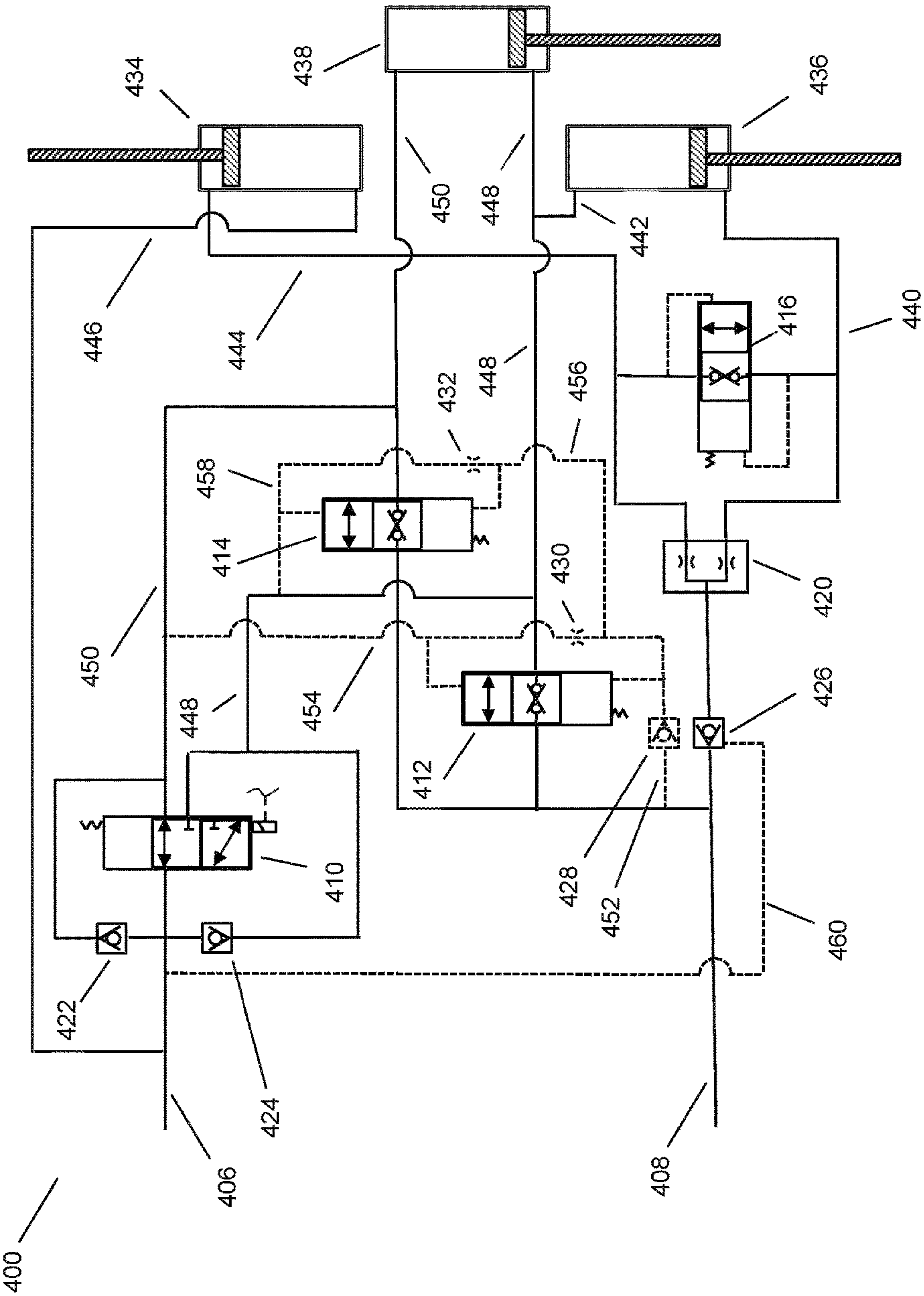
FIG. 14A shows a schematic of a single-double load clamp hydraulic system 400 in a single load mode of operation.

FIG. 14A shows a schematic of a single-double load clamp hydraulic system 400 in a single load mode of operation. The single-double load clamp hydraulic system 400 is part of, and provides power and control for, a clamping load handler such as the first embodiment single-double load clamp 200 or the second embodiment single-double load clamp 300. The single-double load clamp hydraulic system 400 is configured for operating in one of two modes: Single load mode or double load mode. In single load mode a center clamp arm is nested against one outer clamp arm, creating a single clamping zone. In double load mode, the single-double load clamp is configured for gripping two loads-a first load between a first (outer) clamp arm and a third (central) clamp arm and a second load between a second (outer) clamp arm and the third (central) clamp arm. The third (central) actuator will not resist movement while closing in dual mode. This allows the third (central) arm to float to adapt to any load size and prevents unnecessary force on the third (central) actuator.

The single-double load clamp hydraulic system 400 includes a first clamp actuator 434, a second clamp actuator 436, and a third clamp actuator 438 and is configured to provide power and control for them. The actuators (434, 436, and 438) of the single-double load clamp hydraulic system 400 may be the actuators (234, 236, and 238) as described for the first embodiment single-double load clamp 200, or they may be the actuators (334, 336, and 338) as described for the second embodiment single-double load clamp 300, or they may have some differences. In particular, the third clamp actuator 438 may not be a three-cylinder telescoping actuator as are the third clamp actuator 238 in the first embodiment single-double load clamp 200 and the third clamp actuator 338 in the second embodiment single-double load clamp 300, but may be some other suitable actuator such as a single cylinder actuator. The single-double load clamp hydraulic system 400 has a first actuator rod line 444 connected to a rod side of the first clamp actuator 434, a first actuator base line 446 connected to the base side of the first clamp actuator 434, a second actuator rod line 440 connected to a rod side of the second clamp actuator 436, a second actuator base line 442 connected to a base side of the second clamp actuator 436, a third actuator rod line 448 connected to a rod side of the third clamp actuator 438, and a third actuator base line 450 connected to a base side of the third clamp actuator 438.

The single-double load clamp hydraulic system 400 has a clamp open line 406 and a clamp close line 408 that are configured for connecting respectively to a hydraulic feed line and a hydraulic return line from the lift truck 10. A directional control valve on the truck controls flow to and from the clamp open line 406 and clamp close line 408. In a first (open) position the directional control valve ports pressurized hydraulic fluid to the clamp open line 406 and ports the clamp close line 408 to a low-pressure return or sump. In a second (close) position the directional control valve ports pressurized hydraulic fluid to the clamp close line 408 and ports the clamp open line 406 to the low-pressure return. In a third (neutral) position the directional control valve blocks all flow to and from the clamp open line 406 and the clamp close line 408.

The single-double load clamp hydraulic system 400 includes a first check valve 422, a second check valve 424, and a third check valve 426. The first check valve 422 connects the clamp open line 406 to the third actuator base line 450 and allows flow from the third actuator base line 450 to the clamp open line 406, but blocks reverse flow. The second check valve 424 connects the clamp open line 406 to the third actuator rod line 448 and allows flow from the third actuator rod line 448 to the clamp open line 406, but blocks reverse flow. The third check valve 426 connects the clamp close line 408 to a flow divider 420 that connects to the first actuator rod line 444 and the second actuator rod line 440. The flow divider 420 has flow restriction elements to facilitate an even division of flow. The third check valve 426 is a pilot operated check valve with a fifth pilot line 460 that connects a pilot port of the third check valve 426 to the clamp open line 406. The third check valve 426 is configured for allowing hydraulic fluid to flow from the clamp close line 408 to the flow divider 420 but blocks reverse flow unless the pressure in the fifth pilot line 460 exceeds a fractional threshold. The fractional threshold for the third check valve 426 is one third of the pressure on the checked side of the third check valve 426 (the side connected to flow divider 420). However, in other embodiments the fractional threshold for the third check valve 426 may be anywhere from one sixth to unity.

The single-double load clamp hydraulic system 400 includes a first control valve 410, a second control valve 412, a third control valve 414, and a fourth control valve 416. The first control valve 410 is a three-port two-position solenoid operated valve that in a first position allows flow in either direction between a first port connected to the clamp open line 406 and a second port connected to the third actuator base line 450. In a second position, the first control valve 410 allows flow in either direction between the first port connected to the clamp open line 406 and a third port connected to the third actuator rod line 448.

The second control valve 412 is a two-port two-position pilot operated valve that in a first position blocks flow in either direction between a first port connected to the clamp close line 408 and a second port connected to the third actuator rod line 448. In a second position, the second control valve 412 allows flow in either direction between the first port connected to the clamp close line 408 and the second port connected to the third actuator rod line 448. A first pilot line 452 connects the clamp close line 408 to a first pilot port on the second control valve 412. A fourth check valve 428 in the first pilot line 452 allows flow from the clamp close line 408 to the first pilot port on the second control valve 412, but blocks flow in the reverse direction. The first pilot line 452 further connects the first pilot port on the second control valve 412 to a second pilot line 454 via a first flow reducer 430. The second pilot line 454 connects to a second pilot port on the second control valve 412 and connects to the third actuator base line 450. The second control valve 412 is configured for moving to the first position when pressure in first pilot line 452 exceeds pressure in the second pilot line 454 by a first threshold and configured for moving to the second position when pressure in the second pilot line 454 exceeds pressure in the first pilot line 452 by a second threshold. For the second control valve 412, the first and second thresholds are 400 PSI (pounds per square inch), but in other embodiments can be anywhere in the range of 100 to 600 PSI.

The third control valve 414 is a two-port two-position pilot operated valve that in a first position blocks flow in either direction between a first port connected to the clamp close line 408 and a second port connected to the third actuator base line 450. In a second position, the third control valve 414 allows flow in either direction between the first port connected to the clamp close line 408 and the second port connected to the third actuator base line 450. A third pilot line 456 connects the first pilot line 452 to a first pilot port on the third control valve 414. The third pilot line 456 further connects the first pilot port on the third control valve 414 to a fourth pilot line 458 via a second flow reducer 432. The fourth pilot line 458 connects to a second pilot port on the third control valve 414 and connects to the third actuator rod line 448. The third control valve 414 is configured for moving to the first position when pressure in third pilot line 456 exceeds pressure in the fourth pilot line 458 by a first threshold and configured for moving to the second position when pressure in the fourth pilot line 458 exceeds pressure in the third pilot line 456 by a second threshold. For the third control valve 414, the first and second thresholds are 400 PSI (pounds per square inch), but in other embodiments can be anywhere in the range of 100 to 600 PSI.

The fourth control valve 416 is a two-port two-position pilot operated relief valve that in a first (normal) position blocks all flow through the fourth control valve 416. In a second position, the fourth control valve 416 allows flow through the fourth control valve 416 between the first actuator rod line 444 and the second actuator rod line 440. The fourth control valve (416)) is configured to be in the first position unless a differential pressure between the second actuator rod line 440 and the first actuator rod line 444 exceeds a first threshold. The threshold for the fourth control valve 416 is 1500 PSI (pounds per square inch), but in other embodiments can be anywhere in the range of 500 to 2500 PSI.

In some embodiments, the first control valve 410, the second control valve 412, and the third control valve 414, the fourth control valve 416 all share the same manifold.

Hydraulic System-Opening Single Load Mode

Figures 11A, 11B:
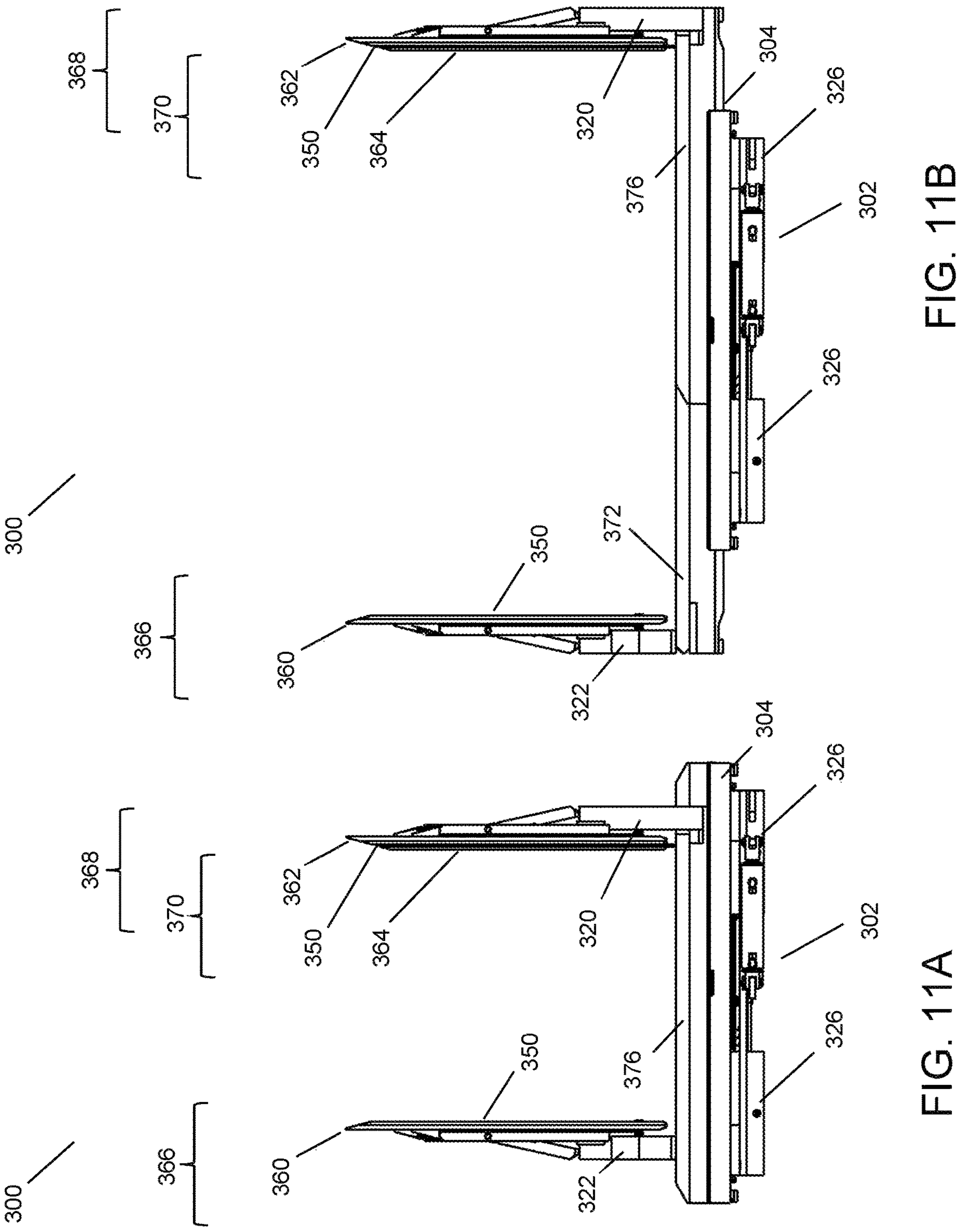
FIG. 11A shows a top view of the second embodiment single-double load clamp 300 in a single load mode, in a closed configuration.
FIG. 11B shows a top view of the second embodiment single-double load clamp 300 in a single load mode, in an open configuration.

In single load mode, one of the outer arms and the central arm act in tandem for gripping a single load. Starting with a single-double load clamp in a fully closed single load mode (see FIG. 11B) or in a fully closed double load mode (see FIG. 10A), the single-double load clamp hydraulic system 400 is put in the single load mode of operation when the first control valve 410 is put in its first position. This is typically done by the lift truck operator de-energizing the solenoid of the first control valve 410 via a wired or wireless control system. In alternative embodiments the first control valve 410 may be put in its first positions by energizing its solenoid.

The lift truck operator then places the directional control valve in a first (open) position, porting pressurized fluid to the clamp open line 406 and connecting the clamp close line 408 to a low pressure sump. Hydraulic fluid flows from the clamp open line 406 to the base side of the first clamp actuator 434 via the first actuator base line 446, causing the first clamp actuator 434 to extend and the first clamp arm 366 to move in an outward direction. Hydraulic fluid flows from the clamp open line 406 through the first control valve 410 to the base side of the third clamp actuator 438 via the third actuator base line 450 causing the third clamp actuator 438 to extend and the third clamp arm 370 to move in an outward direction towards the second clamp arm 368.

Hydraulic fluid pressure in the clamp open line 406 opens the third check valve 426, allowing hydraulic fluid to leave the rod side of the second clamp actuator 436 through the second actuator rod line 440, the flow divider 420, the third check valve 426 and out the clamp close line 408 to the low pressure sump. Hydraulic pressure from the clamp open line 406 is transmitted into the second pilot line 454 via the third actuator base line 450 which causes the second control valve 412 to shift to its second position. This allows hydraulic fluid to flow from the rod side of the third clamp actuator 438 via the third actuator rod line 448, flow through the second control valve 412, and out the clamp close line 408 to the low pressure sump. The rod side of the first clamp actuator 434 has a path for hydraulic fluid to drain out through the first actuator rod line 444, the flow divider 420, the third check valve 426 and out through the clamp close line 408 to sump. The base side of the second clamp actuator 436 has a path for hydraulic fluid to drain out through the second actuator base line 442, through the third actuator rod line 448, through the second control valve 412, and out the clamp close line 408 to the low pressure sump.

Neither side of the second clamp actuator 436 is pressurized, so it will neither extend nor retract on its own. The third clamp actuator 438 will at some point extend the third clamp arm 370 far enough to contact the second clamp arm 368. The third clamp actuator 438 will then push both the third clamp arm 370 and the second clamp arm 368 further outward with hydraulic fluid flowing out from the rod side the second clamp actuator 436 to the low pressure sump and hydraulic fluid flowing into the base side of the second clamp actuator 436 from the third actuator rod line 448. The nested second and third clamp arms (368, 370) continues to move laterally outward until the third clamp actuator 438 reaches maximum extension. The first clamp arm 366 continues to move laterally outward until the first clamp actuator 434 reaches maximum extension. At this point the single-double load clamp is in a fully open single load configuration (see FIG. 11B).

The lift truck operator can return the directional control valve to the third (neutral) position when the single-double load clamp is in a fully open configuration or at any point in-between fully closed and fully open. Pressure is then lost in the clamp open line 406 and the path from the clamp close line 408 to the sump is cut off. With pressure lost in the second pilot line 454, the second control valve 412 returns to its first position, blocking flow from the third actuator rod line 448 and the second actuator base line 442. With pressure lost in the fifth pilot line 460, the third check valve 426 returns to its check position blocking flow from the second actuator rod line 440 and the first actuator rod line 444. With these paths blocked, the actuators (434, 436, 438) and the clamp arms (366, 368, 370) are effectively held in their current positions.

Hydraulic System-Closing Single Load Mode

Starting with the single-double load clamp in a fully open single load mode (see FIG. 11B), to close the clamp arms (366, 368, 370) on a single load the lift truck operator places the directional control valve in the second (close) position. This directs pressurized hydraulic fluid to the clamp close line 408. Pressurized hydraulic fluid passes through the third check valve 426, through the flow divider 420, through the second actuator rod line 440 and the first actuator rod line 444, causing the first clamp actuator 434 and the second clamp actuator 436 to retract, moving the first clamp arm 366 and second clamp arm 368 inward.

Hydraulic fluid leaves the base side of the first clamp actuator 434 through the first actuator base line 446, through the clamp open line 406 and then to the lift truck sump. Hydraulic fluid leaves the base side of the second clamp actuator 436 through the second actuator base line 442, through the third actuator rod line 448, through the second check valve 424 to the clamp open line 406 and then to the lift truck sump.

The second clamp arm 368 pushes the third clamp arm 370 inward, with hydraulic fluid leaving the base side of the third clamp actuator 438 through the third actuator base line 450, the first control valve 410, then to the clamp open line 406 and then to the lift truck sump. Hydraulic fluid fills the rod side of the third clamp actuator 438 from the base side of the second clamp actuator 436 through the second actuator base line 442 and the third actuator rod line 448. Eventually the first clamp actuator 434 and second clamp actuator 436 cannot retract any further. At this point the single-double load clamp is in a fully closed single load configuration (see FIG. 11A).

The lift truck operator can return the directional control valve to the third (neutral) position when the single-double load clamp is in a fully closed configuration or at any point in-between fully open and fully closed. Pressure is then lost in the clamp close line 408 and the path from the clamp open line 406 to the sump is cut off. With these paths blocked, the actuators (434, 436, 438) and the clamp arms (366, 368, 370) are effectively held in their current positions.

Hydraulic System-Opening Double Load Mode

Figure 14B:
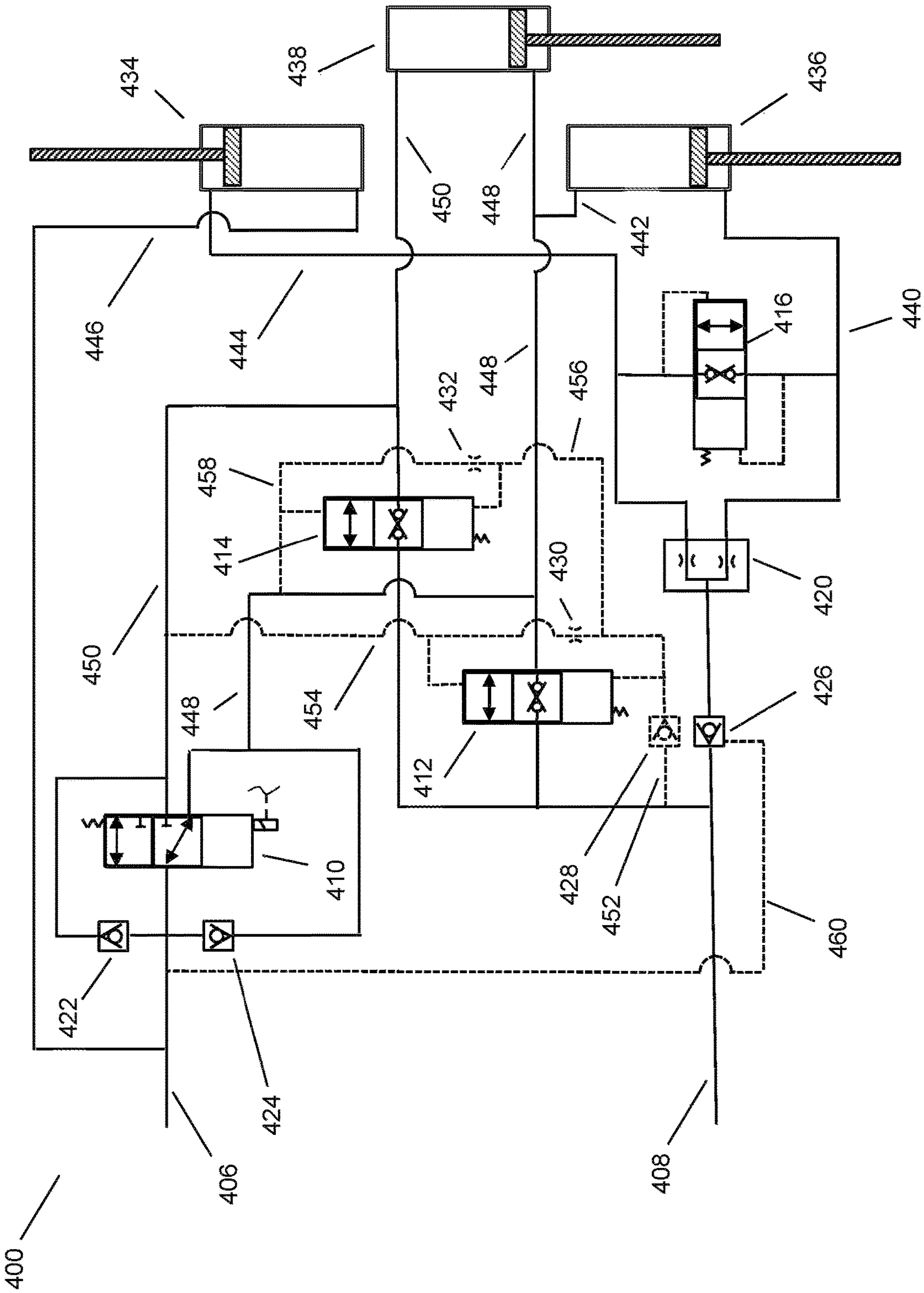
FIG. 14B shows a schematic of a single-double load clamp hydraulic system 400 in a double load mode of operation.

Starting with a single-double load clamp in a fully closed single load mode (see FIG. 11A) or in a fully closed double load mode (see FIG. 10A), the single-double load clamp hydraulic system 400 is put in the double load mode of operation when the first control valve 410 is put in its second position (see FIG. 14B). This is typically done by the lift truck operator energizing the solenoid of the first control valve 410 via a wired or wireless control system. In alternative embodiments the first control valve 410 may be put in its second position by de-energizing its solenoid.

The lift truck operator then places the directional control valve in a first (open) position, porting pressurized fluid to the clamp open line 406 and connecting the clamp close line 408 to a low pressure sump. Hydraulic fluid flows from the clamp open line 406 to the first actuator base line 446 and from the clamp open line 406 through the first control valve 410 to the third actuator rod line 448 and then to the second actuator base line 442. This causes the first clamp actuator 434 and the second clamp actuator 436 to extend, moving the first clamp arm 366 and the second clamp arm 368 outwards and causes the third clamp actuator 438 tor retract, moving the third clamp arm 370 towards the center of the frame 302.

Hydraulic fluid pressure in the clamp open line 406 opens the third check valve 426. This allows hydraulic fluid to leave the rod side of the first clamp actuator 434 through the first actuator rod line 444, the flow divider 420, the third check valve 426 and out the clamp close line 408 to the low pressure sump, and further allows hydraulic fluid to leave the rod side of the second clamp actuator 436 through the second actuator rod line 440, the flow divider 420, the third check valve 426 and out the clamp close line 408 to the low pressure sump. Hydraulic pressure from the clamp open line 406 is transmitted via the third actuator rod line 448 into the fourth pilot line 458 which causes the third control valve 414 to shift to its second position. This allows hydraulic fluid to flow from the base side of the third clamp actuator 438 via the third actuator base line 450, flow through the second control valve 412, and out the clamp close line 408 to the low pressure sump.

The third clamp actuator 438 will eventually fully retract the third clamp arm 370 to the center of the frame 302. The first clamp actuator 434 and the second clamp actuator 436 will eventually fully extend the first clamp arm 366 and the second clamp arm 368. At this point the single-double load clamp is in a fully open double load configuration (see FIG. 10B).

The lift truck operator can return the directional control valve to the third (neutral) position when the single-double load clamp is in a fully open configuration or at any point in-between fully closed and fully open. Pressure is then lost in the clamp open line 406 and the path from the clamp close line 408 to the sump is cut off. With pressure lost in the 460, the third check valve 426 returns to its check position blocking flow from the second actuator rod line 440 and the first actuator rod line 444. With these paths blocked, the actuators (434, 436, 438) and the clamp arms (366, 368, 370) are effectively held in their current positions.

Hydraulic System-Closing Double Load Mode

Starting with the single-double load clamp in fully open double load mode (see FIG. 10B), to close the clamp arms (366, 368, 370) on two loads, one on each side of the third clamp arm 370, the lift truck operator places the directional control valve in the second (close) position. This directs pressurized hydraulic fluid to the clamp close line 408 and connecting the clamp open line 406 to a low pressure sump. Pressurized hydraulic fluid passes through the third check valve 426, through the flow divider 420, through the second actuator rod line 440 and the first actuator rod line 444, causing the first clamp actuator 434 and the second clamp actuator 436 to retract, moving the first clamp arm 366 and second clamp arm 368 inward.

Hydraulic fluid leaves the base side of the first clamp actuator 434 through the first actuator base line 446, through the clamp open line 406 and then to the lift truck sump. Hydraulic fluid leaves the base side of the second clamp actuator 436 through the second actuator base line 442, through the third actuator rod line 448, through the second check valve 424 to the clamp open line 406 and then to the lift truck sump.

The second pilot line 454 and the fourth pilot line 458 are depressurized with paths to sump through the first check valve 422 and the second check valve 424 respectively, so the second control valve 412 and the third control valve 414 remain in their first positions. In these positions, they block pressurized hydraulic fluid from the clamp close line 408 from reaching the third clamp actuator 438, so no pressure reaches the third clamp actuator 438 to cause it to move. However, both sides of the third clamp actuator 438 have open paths to sump. The base side of the third clamp actuator 438 can drain hydraulic fluid through the third actuator base line 450, through the first check valve 422, through the clamp open line 406 to sump. The rod side of the third clamp actuator 438 can drain hydraulic fluid through the third actuator rod line 448, through the second check valve 424, through the clamp open line 406 to sump. Thus, the third clamp actuator 438 and the third clamp arm 370 are free to move and will not resist being moved by other forces. As the first clamp actuator 434 and the second clamp actuator 436 retract, either the first clamp arm 366 or the second clamp arm 368 will contact one of the loads first, depending on which load is wider—the first load between the first clamp arm 366 and the third clamp arm 370 or the second load between the second clamp arm 368 and the third clamp arm 370. If the first clamp arm 366 contacts the first load before the second clamp arm 368 contacts the second load, the first clamp arm 366 will push the first load into contact with third clamp arm 370 then push the first load and the third clamp arm 370 towards the second load and the second clamp arm 368. If the second clamp arm 368 contacts the second load before the first clamp arm 366 contacts the first load, the second clamp arm 368 will push the second load into contact with third clamp arm 370 then push the second load and the third clamp arm 370 towards the first load and the first clamp arm 366. If no loads are contacted, eventually the first clamp actuator 434 and second clamp actuator 436 cannot retract any further. At this point the single-double load clamp is in a fully closed double load configuration (see FIG. 10A).

The lift truck operator can return the directional control valve to the third (neutral) position when the single-double load clamp is in a fully closed configuration or at any point in-between fully open and fully closed. Pressure is then lost in the clamp close line 408 and the path from the clamp open line 406 to the sump is cut off. With these paths blocked, the actuators (434, 436, 438) and the clamp arms (366, 368, 370) are effectively held in their current positions.

Electrical Control System for Single-Double Load Clamp

In some alternative embodiments, the clamp actuators are electrical, controlled by an electronic controller. The electronic controller is configured for operating similarly to the first and second embodiments in one of two modes: Single load mode or double load mode. In single load mode a center clamp arm is nested against one outer clamp arm, creating a single clamping zone. In double load mode, the single-double load clamp is configured for gripping two loads-a first load between a first (outer) clamp arm and a third (central) clamp arm and a second load between a second (outer) clamp arm and the third (central) clamp arm. The third (central) actuator will not resist movement while closing in dual mode. This allows the third (central) arm to float to adapt to any load size and prevents unnecessary force on the third (central) actuator.

What is claimed is:

1. A load handler for a lift truck (10) comprising:

a frame (202, 302) with a first side and a second side laterally separated by a center of the frame (202, 302);

a first clamp arm (266, 366) slidingly coupled to the frame (202, 302) and having a first clamp plate (260, 360);

a second clamp arm (268, 368) slidingly coupled to the frame (202, 302) and having a second clamp plate (262, 362);

a third clamp arm (270, 370) slidingly coupled to the frame (202, 302) and having a third clamp plate (264, 364);

a first clamp actuator (234, 334, 434) coupled to the frame (40, 202, 302) and to the first clamp arm (266, 366), configured for moving the first clamp plate (260, 360) laterally on the first side of the frame (202, 302);

a second clamp actuator (236, 336, 436) coupled to the frame (202, 302) and to the second clamp arm (268, 368), configured for moving the second clamp plate (262, 362) laterally on the second side of the frame (40, 202, 302); and a third clamp actuator (238, 338, 438) coupled to the frame (202, 302) and to the third clamp arm (270, 370), configured for moving the third clamp arm (270, 370) between the center of the frame (202, 302) and the second clamp plate (262, 362).

2. The load handler of claim 1, wherein the third clamp actuator (238, 338, 438) is a telescoping actuator.

3. The load handler of claim 2, wherein the third clamp actuator (238, 338, 438) comprises three actuators coupled together, each having one of three rods, each of the three rods in parallel.

4. The load handler of claim 3, wherein one of the rods of the third clamp actuator (238, 338, 438) is coupled to the frame (202, 302) and the other two rods are coupled to the third clamp arm (270, 370).

5. The load handler of claim 3, wherein one of the rods of the third clamp actuator (238, 338, 438) is coupled to the third clamp arm (270, 370) and the other two rods are coupled to the frame (202, 302).

6. The load handler of claim 3, wherein each of the three actuators of the third clamp actuator (238, 338, 438) have a rod stroke that is half of the rod stroke of the second clamp actuator (236, 336, 436).

7. The load handler of claim 1, wherein the third clamp actuator (238, 338, 438) is a telescoping actuator comprising three actuators coupled together, each one of three rods, each of the three rods in parallel;

wherein one of the rods of the third clamp actuator (238, 338, 438) is coupled to the frame (202, 302) and the other two rods are coupled to the third clamp arm (270, 370); and wherein each of the three actuators of the third clamp actuator (238, 338, 438) have a rod stroke that is half of the rod stroke of the second clamp actuator (236, 336, 436).

8. The load handler of claim 2, wherein the third clamp actuator (238, 338, 438) comprises three concentric hydraulic cylinders.

9. The load handler of claim 1, wherein the third clamp plate (364) is everywhere thinner than either the first clamp plate 360 or the second clamp plate 362.

10. The load handler of claim 1, wherein the third clamp plate (364) is everywhere no more than half a thickness of either the first clamp plate (360) or the second clamp plate (362).

11. The load handler of claim 1, wherein the third clamp plate (364) is on average thinner than either the first clamp plate (360) or the second clamp plate (362).

12. The load handler of claim 1, wherein the third clamp plate (364) is on average no more than half a thickness of either the first clamp plate (360) or the second clamp plate (362).

13. The load handler of claim 1, wherein the first clamp arm (366) includes two sliding beams (376, 378);

wherein the second clamp arm (368) includes two sliding beams (372, 374); and wherein the second clamp arm (370) includes two sliding beams (380, 382).

14. The load handler of claim 13, wherein the third clamp arm (370) forward of the sliding beams (380, 382) has a volume less than a volume of either the first clamp arm (366) forward of the sliding beams (376, 378) or the second clamp arm (368) when measured forward of the sliding beams (372, 374).

15. The load handler of claim 13, wherein the third clamp arm (370) forward of the sliding beams (380, 382) has a volume less than half of a volume of either the first clamp arm (366) forward of the sliding beams (376, 378) or the second clamp arm (368) when measured forward of the sliding beams (372, 374).

16. The load handler of claim 13, further comprising a load contact plane defined by a front of the sliding beams (372, 374, 376, 378, 380, 382);

wherein the third clamp arm (370) forward of the load contact plane has a volume less than half of a volume of either the first clamp arm (366) forward of the load contact plane or the second clamp arm (368) when measured forward of the load contact plane.

17. The load handler of claim 13, further comprising a load contact plane parallel to the frame (302) where a load contacts the load handler; and wherein the third clamp arm (370) forward of the load contact plane has a volume less than half of a volume of either the first clamp arm (366) forward of the load contact plane or the second clamp arm (368) when measured forward of the load contact plane.

18. The load handler of claim 1, wherein the third clamp plate (364) has an average thickness of at least an inch.

19. The load handler of claim 1, wherein the third clamp plate (364) has an average thickness of no more than an inch.

20. The load handler of claim 1, further comprising:

a control system coupled to the frame (202, 302) and configured for operating the load handler in an opening single load mode by moving the third clamp plate (264, 364) laterally outward until nested against the second clamp plate (262, 362), then moving the second clamp plate (262, 362) laterally outward in tandem with the third clamp plate (264, 364);

the control system further configured for operating the load handler in a closing single load mode by moving the second clamp plate (262, 362) laterally inward in tandem with the third clamp plate (264, 364);

the control system further configured for operating the load handler in an opening double load mode by moving the third clamp plate (264, 364) laterally towards the center of the frame (202, 302) while moving the first clamp plate (260, 360) and the second clamp plate (262, 362) laterally outward; and the control system further configured for operating the load handler in a closing double load mode moving the first clamp plate (260, 360) and the second clamp plate (262, 362) laterally inward while the third clamp plate (264, 364) does not resist lateral movement.

21. The load handler of claim 1, further comprising:

a clamp open line (406);

a clamp close line (408);

a first check valve (422) configured for allowing flow from a third actuator base line (450) to the clamp open line (406), but blocking reverse flow;

a second check valve (424) configured for allowing flow from a third actuator rod line (448) to the clamp open line (406), but blocking reverse flow;

a third check valve (426) configured for allowing flow from the clamp close line (408) to a flow divider (420) but blocking reverse flow unless pressure in a fifth pilot line (460) exceeds a fractional threshold of a pressure between the third check valve (426) and the flow divider (420);

a fourth check valve (428) in a first pilot line (452) configured for allowing flow from a first pilot port on a second control valve (412) to the clamp close line (408), but blocking reverse flow;

the flow divider (420) configured to divide flow from the third check valve (426) between a first actuator rod line (444) and a second actuator rod line (440);

the first pilot line (452) connected to the clamp close line (408) and to the first pilot port of the second control valve (412);

a second pilot line (454) connected to the first pilot line (452) via a first flow reducer (430), to a second pilot port on the second control valve (412), and to the third actuator base line (450);

a third pilot line (456) connected to the first pilot line (452), to a first pilot port on a third control valve (414) and to a fourth pilot line (458) via a second flow reducer (432);

the fourth pilot line (458) connected to a second pilot port on the third control valve (414) and to the third actuator rod line (448);

the fifth pilot line (460) connected to the clamp open line (406);

a first control valve (410) configured for allowing flow in either direction between the clamp open line (406) and the third actuator base line (450) while the first control valve (410) is in a first position;

the first control valve (410) configured for allowing flow in either direction between the clamp open line (406) and a third actuator rod line (448) while the first control valve (410) is in a second position;

the second control valve (412) configured for allowing flow in either direction between the clamp close line (408) and the third actuator rod line (448) while the second control valve (412) is in a second position and blocking flow while the second control valve (412) is in a first position;

the second control valve (412) configured for moving to the first position when pressure in first pilot line (452) exceeds pressure in the second pilot line (454) by a first threshold and configured for moving to the second position when pressure in the second pilot line (454) exceeds pressure in the first pilot line (452) by a second threshold;

the third control valve (414) configured for blocking flow while in a first position and allowing flow in either direction between the clamp close line (408) and the third actuator base line (450) while the third control valve (414) is in a second position; and the third control valve (414) configured for moving to the first position when pressure in third pilot line (456) exceeds pressure in the fourth pilot line (458) by a first threshold and configured for moving to the second position when pressure in the fourth pilot line (458) exceeds pressure in the third pilot line (456) by a second threshold.

22. The load handler of claim 21, wherein the flow divider (420) has flow restriction elements to facilitate an even division of flow.

23. The load handler of claim 21, wherein the first control valve (410) is solenoid operated.

24. The load handler of claim 21, a fourth control valve (416) configured for blocking flow through the fourth control valve (416) while in a first position and configured for allowing flow through the fourth control valve (416) between the first actuator rod line (444) and the second actuator rod line (440) while the fourth control valve (416) is in a second position, wherein the fourth control valve (416) is configured to be in the first position unless a differential pressure between the second actuator rod line 440 and the first actuator rod line 444 exceeds a threshold.

25. The load handler of claim 21, wherein the fractional threshold for the third check valve (426) is at least one third.

26. The load handler of claim 21, wherein the first threshold of the second control valve (412) is in a range of 100 to 600 pounds per square inch;

wherein the second threshold of the second control valve (412) is in a range of 100 to 600 pounds per square inch;

wherein the first threshold of the third control valve (414) is in a range of 100 to 600 pounds per square inch; and wherein the second threshold of the third control valve (414) is in a range of 100 to 600 pounds per square inch.

* * * * *